(12) United States Patent
Lee et al.

(10) Patent No.: US 11,375,535 B2
(45) Date of Patent: Jun. 28, 2022

(54) METHOD AND APPARATUS FOR SELECTING A SIDELINK RESOURCE FOR A SIDELINK CSI REPORTING IN A WIRELESS COMMUNICATION SYSTEM

(71) Applicant: LG ELECTRONICS INC., Seoul (KR)

(72) Inventors: Youngdae Lee, Seoul (KR); Giwon Park, Seoul (KR); Jongyoul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/570,259

(22) Filed: Jan. 6, 2022

(65) Prior Publication Data

US 2022/0132558 A1    Apr. 28, 2022

Related U.S. Application Data

(63) Continuation of application No. PCT/KR2020/015506, filed on Nov. 6, 2020.

(30) Foreign Application Priority Data

Nov. 7, 2019    (KR) .................. 10-2019-0142103

(51) Int. Cl.
*H04W 72/14*    (2009.01)
*H04W 24/10*    (2009.01)
*H04W 76/14*    (2018.01)

(52) U.S. Cl.
CPC .......... *H04W 72/14* (2013.01); *H04W 24/10* (2013.01); *H04W 76/14* (2018.02)

(58) Field of Classification Search
CPC ....... H04L 43/06; H04W 8/005; H04W 24/02; H04W 24/10; H04W 28/12; H04W 36/00;
(Continued)

(56) References Cited

U.S. PATENT DOCUMENTS

| 2019/0182890 A1 | 6/2019 | Jeong et al. |
| 2021/0044956 A1* | 2/2021 | Kim ...................... H04W 76/27 |
| 2021/0051653 A1* | 2/2021 | Park .................. H04W 72/0413 |

(Continued)

FOREIGN PATENT DOCUMENTS

| KR | 1020210010267 A | * | 1/2021 | ............ H04W 92/18 |
| WO | WO-2021003475 A1 | * | 1/2021 | ........... H04L 1/1829 |

OTHER PUBLICATIONS

Huawei et al., "Sidelink physical layer procedures for NR V2X", R1-1910059, 3GPP TSG RAN WG1 Meeting #98bis, Chongqing, China, Oct. 14-20, 2019, sections 3.2, 3.3.1.

(Continued)

*Primary Examiner* — Thomas R Cairns
(74) *Attorney, Agent, or Firm* — Dentons US LLP

(57) ABSTRACT

A method and apparatus for selecting a sidelink resource for a sidelink CSI reporting in a wireless communication system is provided. A first wireless device triggers the SL CSI reporting for the PC5-RRC connection. A first wireless device determines to create a sidelink grant corresponding to transmission of a single MAC PDU based on the triggered SL CSI reporting or a SL data available for transmission. A first wireless device triggers a resource selection procedure based on the determination. A first wireless device selects a sidelink resource in the resource selection procedure.

20 Claims, 16 Drawing Sheets

(58) Field of Classification Search
CPC ......... H04W 36/0083; H04W 36/0088; H04W 40/24; H04W 52/365; H04W 72/08; H04W 72/14; H04W 76/14; H04W 84/18
See application file for complete search history.

(56) References Cited

U.S. PATENT DOCUMENTS

2021/0105055 A1* 4/2021 Chae .................... H04L 5/0091
2021/0136731 A1* 5/2021 Li ........................ H04W 72/02

OTHER PUBLICATIONS

Lenovo et al., "Considerations on QoS based resource pool for NR V2X", R2-1912914, 3GPP TSG RAN WG2 Meeting #107bis, Chongqing, China, Oct. 14-18, 2019, section 2.2.
Kyocera, "Resource Allocation Mode-2", R1-1907101,3GPP TSG RAN WG1 Meeting #97, Reno, Nevada, May 13-17, 2019, section 2.2.
CATT, "Resource (Re-) selection function in NR V2X Sidelink", R2-1912163, 3GPP TSG RAN WG2 Meeting #107bis, Chongqing, China, Oct. 14-18, 2019, section 2.1.
Section 5.2.3, "3rd Generation Partnership Project; Technical Specification Group Radio Access Network; Evolved Universal Terrestrial Radio Access (E-UTRA) and Evolved Universal Terrestrial Radio Access Network (E-UTRAN) Overall description; Stage 2 (Release 15)", 3GPP TS 36.300 V15.6.0 (Jun. 2019), 365 pages.
Section 5.3, "3rd Generation Partnership Project; Technical Specification Group Radio Access Network; NR; Study on NR Vehicle-to-Everything (V2X) (Release 16)", 3GPP TR 38.885 V16.0.0 (Mar. 2019), 122 pages.

* cited by examiner

METHOD AND APPARATUS FOR SELECTING A SIDELINK RESOURCE FOR A SIDELINK CSI REPORTING IN A WIRELESS COMMUNICATION SYSTEM

This application is a Continuation Application of International Application No. PCT/KR2020/015506, filed on Nov. 6, 2020, which claims the benefit of and priority to Korean Application No. 10-2019-0142103, filed on Nov. 7, 2019, the contents of which are all hereby incorporated by reference herein in their entirety.

BACKGROUND

Technical Field

The present disclosure relates to method and apparatus for selecting a sidelink resource for a sidelink CSI reporting in a wireless communication system.

Related Art

Wireless communication systems generally aim to reduce costs for users and providers, improve service quality, and expand and improve coverage and system capacity. To achieve these goals, in some scenarios, wireless communication systems are designed to reduced cost per bit, increased service availability, flexible use of a frequency band, a simple structure, an open interface, and adequate power consumption of a terminal as an upper-level requirement.

SUMMARY

Technical Objects

The Sidelink Channel Status Information (SL CSI) reporting procedure is used to provide a peer UE with sidelink channel status such as CQI and RI.

However, there are some cases that a proper sidelink resource is not allocated for the triggered SL CSI reporting procedure.

Therefore, studies for selecting a sidelink resource for a sidelink reporting in a wireless communication system are required.

Technical Solutions

In an aspect, a method performed by a first wireless device in a wireless communication system, the method comprising is provided. A first wireless device triggers the SL CSI reporting for the PC5-RRC connection. A first wireless device determines to create a sidelink grant corresponding to transmission of a single MAC PDU based on the triggered SL CSI reporting or a SL data available for transmission. A first wireless device triggers a resource selection procedure based on the determination. A first wireless device selects a sidelink resource in the resource selection procedure.

In another aspect, an apparatus for implementing the above method is provided.

Technical Effects

The present disclosure can have various advantageous effects.

According to some embodiments of the present disclosure, a wireless device could select a sidelink resource for a sidelink reporting in a wireless communication system efficiently.

For example, a wireless device could perform the CSI reporting properly by allocating sidelink resources efficiently.

For example, a wireless communication system could properly provide resource management by selecting a sidelink resource for a sidelink reporting in a wireless communication system.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
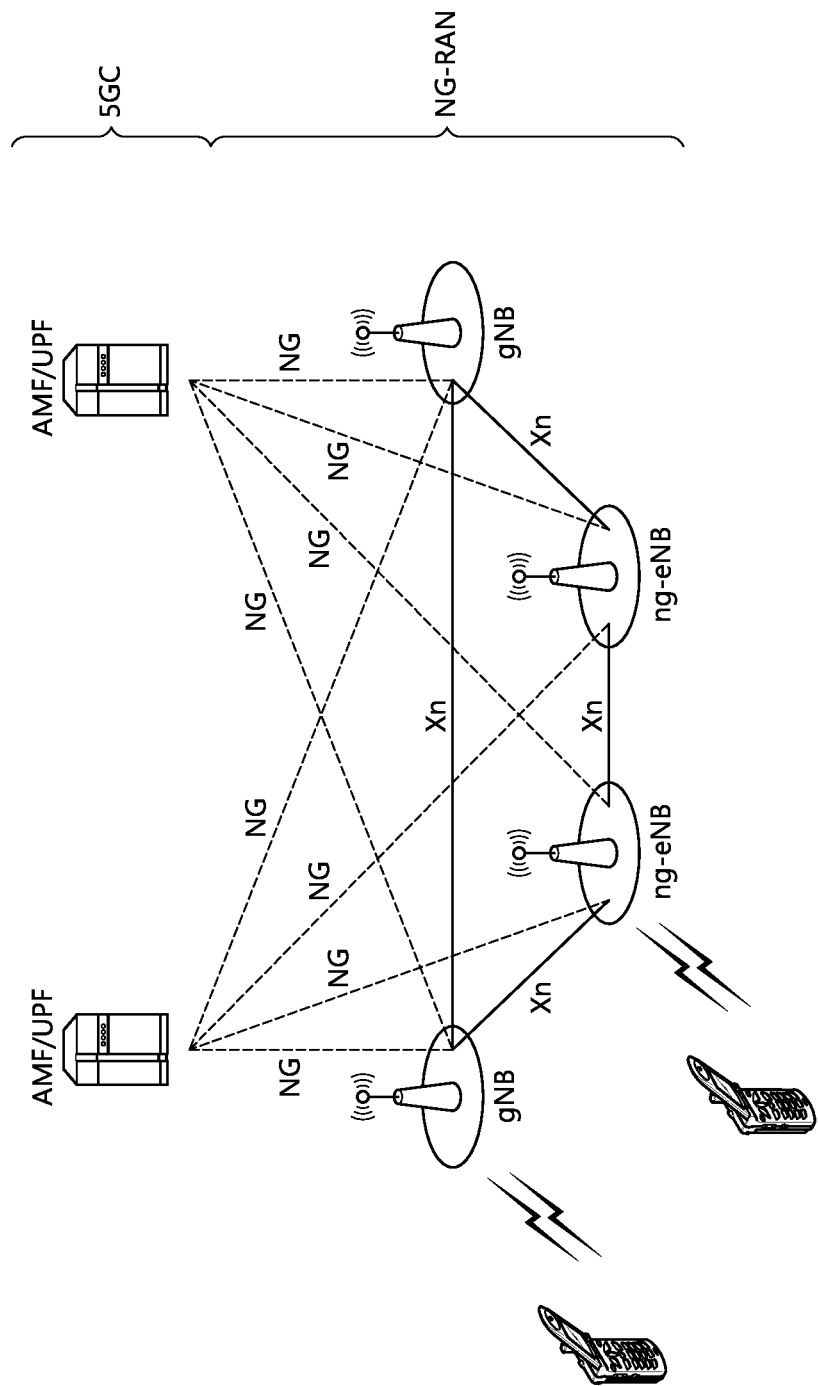
FIG. 1 shows an example of a wireless communication system to which implementations of the present disclosure can be applied.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Vehicle-to-everything (V2X) communication is the communication of information from a vehicle to an entity that may affect the vehicle, and vice versa. Examples of V2X include vehicle-to-infrastructure (V2I), vehicle-to-network (V2N), vehicle-to-vehicle (V2V), vehicle-to-pedestrian (V2P), vehicle-to-device (V2D), and vehicle-to-grid (V2G).

V2X systems may be designed to achieve various objectives, such as road safety, traffic efficiency, and energy savings. V2X communication technology may be classified into two types, depending on the underlying technology: wireless local area network (WLAN)-based V2X, and cellular-based V2X.

The 3rd generation partnership project (3GPP) long-term evolution (LTE) is a technology designed to enable high-speed packet communications. In addition, the international telecommunication union (ITU) and 3GPP have developed technical standards for new radio (NR) systems. In doing so, technology is being identified and developed to successfully standardize the new radio access technology (RAT), in order to timely satisfy both urgent market needs, as well as longer-term goals and requirements set forth by the ITU radio communication sector (ITU-R) international mobile telecommunications (IMT)-2020 process. In some scenarios, NR is being designed to use any spectrum band ranging at least up to 100 GHz, which may be made available for wireless communications even in a more distant future.

The NR targets a technical framework addressing various usage scenarios, requirements, and deployment scenarios, such as, for example, enhanced mobile broadband (eMBB), massive machine-type-communications (mMTC), ultra-reliable and low latency communications (URLLC), etc.

In some systems, one or more technical features described below may be compatible with one or more technical standards, such as those used by a communication standard by the 3GPP standardization organization, a communication standard by the institute of electrical and electronics engineers (IEEE), etc. For example, the communication standards by the 3GPP standardization organization include LTE and/or evolution of LTE systems. The evolution of LTE systems includes LTE-advanced (LTE-A), LTE-A Pro, and/or 5G NR. The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a wireless communication system to which implementations of the present disclosure can be applied.

Referring to FIG. 1, the wireless communication system includes one or more user equipment (UE), a next-generation RAN (NG-RAN) and a 5th generation core network (5GC). The NG-RAN consists of at least one NG-RAN node. The NG-RAN node consists of at least one gNB and/or at least one ng-eNB. The gNB provides NR user plane and control plane protocol terminations towards the UE. The ng-eNB provides E-UTRA user plane and control plane protocol terminations towards the UE.

The 5GC includes an access and mobility management function (AMF), a user plane function (UPF) and a session management function (SMF). The AMF hosts various functions, such as, for example, non-access stratum (NAS) security, idle state mobility handling, evolved packet system (EPS) bearer control, etc. The UPF hosts various functions, such as, for example, mobility anchoring, protocol data unit (PDU) handling, etc. The SMF hosts various functions, such as, for example, UE IP address allocation, PDU session control, etc.

The gNBs and ng-eNBs are interconnected with each other by an interface, such as the Xn interface. The gNBs and ng-eNBs are also connected by NG interfaces to the 5GC, for example, to the AMF by the NG-C interface and to the UPF by the NG-U interface.

An example of a protocol structure between network entities described above is described. In the example of FIG. 1, layers of a radio interface protocol between the UE and the network (e.g. NG-RAN) may be classified into a first layer (L1), a second layer (L2), and a third layer (L3), for example based on the lower three layers of the open system interconnection (OSI) model.

Figure 2:
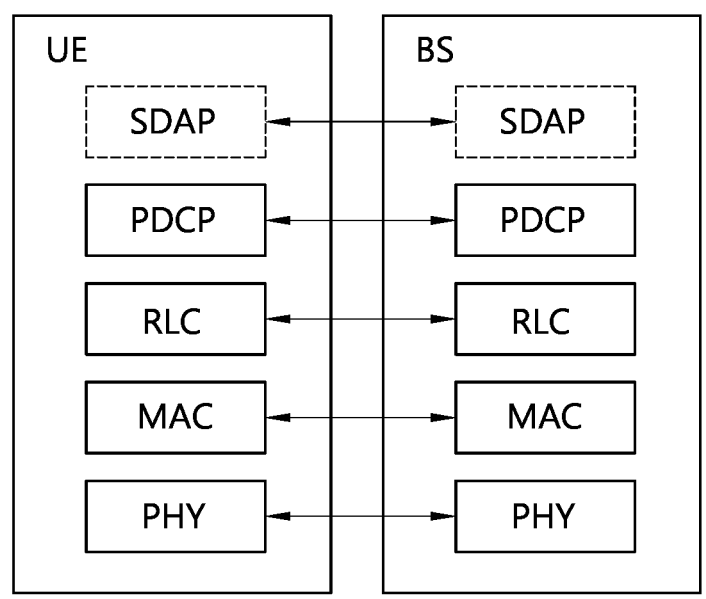
FIG. 2 shows a block diagram of an example of a user plane protocol stack t to which implementations of the present disclosure can be applied.
Figure 3:
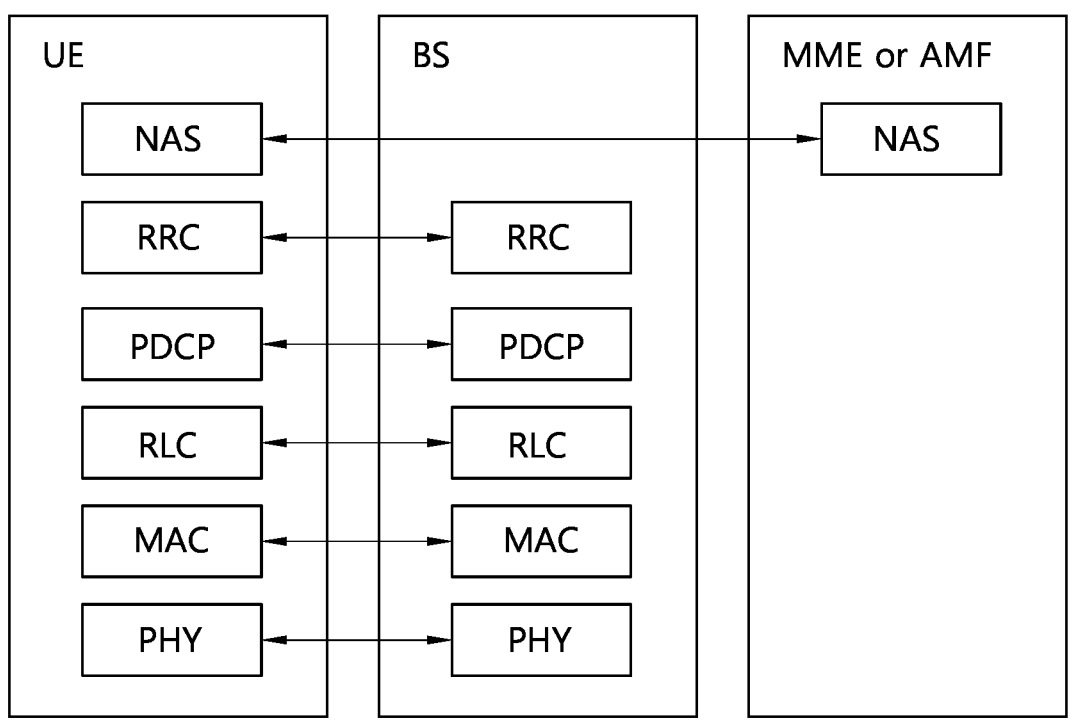
FIG. 3 shows a block diagram of an example of a control plane protocol stack to which implementations of the present disclosure can be applied.

FIG. 2 shows a block diagram of an example of a user plane protocol stack t to which implementations of the present disclosure can be applied. FIG. 3 shows a block diagram of an example of a control plane protocol stack to which implementations of the present disclosure can be applied.

Referring to the examples of FIG. 2 and FIG. 3, a physical (PHY) layer belongs to LL. The PHY layer offers information transfer services to the media access control (MAC) sublayer and higher layers. For example, the PHY layer offers transport channels to the MAC sublayer, and data between the MAC sublayer and the PHY layer is transferred via the transport channels. Between different PHY layers, e.g., between a PHY layer of a transmission side and a PHY layer of a reception side, data is transferred via physical channels.

The MAC sublayer belongs to L2. The services and functions of the MAC sublayer include, for example, mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by dynamic scheduling, priority handling between logical channels of one UE by logical channel prioritization (LCP), etc. The MAC sublayer offers to the radio link control (RLC) sublayer logical channels.

The RLC sublayer belong to L2. In some implementations, the RLC sublayer supports different transmission modes, e.g., transparent mode (TM), unacknowledged mode (UM), and acknowledged mode (AM). The different transmission modes may help guarantee various quality of services (QoS) required by radio bearers. The services and functions of the RLC sublayer may depend on the transmission mode. For example, in some implementations, the RLC sublayer provides transfer of upper layer PDUs for all three modes, but provides error correction through ARQ for AM only. In some implementations, such as implementations compatible with LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). In some implementations, the NR does not support concatenation of RLC SDUs. The RLC sublayer offers RLC channels to the packet data convergence protocol (PDCP) sublayer.

The PDCP sublayer belongs to L2. The services and functions of the PDCP sublayer for the user plane include, for example, header compression and decompression, transfer of user data, duplicate detection, PDCP PDU routing, retransmission of PDCP SDUs, ciphering and deciphering, etc. The services and functions of the PDCP sublayer for the control plane include, for example, ciphering and integrity protection, transfer of control plane data, etc.

The service data adaptation protocol (SDAP) sublayer belongs to L2. In some implementations, the SDAP sublayer is only defined in the user plane. The services and functions of SDAP include, for example, mapping between a QoS flow and a data radio bearer (DRB), and marking QoS flow ID (QFI) in both DL and UL packets. The SDAP sublayer offers QoS flows to 5GC.

A radio resource control (RRC) layer belongs to L3. In some implementations, the RRC layer is only defined in the control plane. The RRC layer controls radio resources between the UE and the network. For example, the RRC layer exchanges RRC messages between the UE and the BS. The services and functions of the RRC layer include, for example, broadcast of system information related to access stratum AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

As such, in some implementations, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. In some scenarios, setting the radio bearer may include defining the characteristics of the radio protocol layer and the channel for providing a specific service, and setting each specific parameter and operation method. Radio bearers may include signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the network. In some implementations, when the RRC connection is established between the RRC layer of the UE and the RRC layer of the network, the UE is in the RRC connected state (RRC_CONNECTED); and otherwise, the UE is in the RRC idle state (RRC_IDLE). In implementations compatible with NR, the RRC inactive state (RRC_INACTIVE) is additionally introduced. The RRC_INACTIVE state may be used for various purposes. For example, in some scenarios, massive machine-type communications (mMTC) UEs can be efficiently managed in RRC_INACTIVE. When specific conditions are satisfied, transitions can be made from one of the above three states to others.

Various operations may be performed according to the RRC state. For example, in RRC_IDLE, operations such as public land mobile network (PLMN) selection, broadcast of system information (SI), cell re-selection mobility, core network (CN) paging and discontinuous reception (DRX) configured by NAS may be performed. The UE may be allocated an identifier (ID) which uniquely identifies the UE in a tracking area. In some implementations, no RRC context is stored in the base station.

As another example, in RRC_CONNECTED, the UE has an RRC connection with the network. Network-CN connection (both C/U-planes) is also established for UE. In some implementations, the UE AS context is stored in the network and the UE. The RAN knows the cell which the UE belongs to, and the network can transmit and/or receive data to/from UE. In some implementations, network controlled mobility including measurement is also performed.

One or more operations that are performed in RRC_IDLE may also be performed in RRC_INACTIVE. However, in some implementations, instead of performing CN paging as in RRC_IDLE, RAN paging may be performed in RRC_INACTIVE. For example, in RRC_IDLE, paging for mobile terminated (MT) data is initiated by a core network and paging area is managed by the core network. In RRC_INACTIVE, paging may be initiated by NG-RAN, and RAN-based notification area (RNA) is managed by NG-RAN. Further, in some implementations, instead of DRX for CN paging configured by NAS in RRC_IDLE, DRX for RAN paging is configured by NG-RAN in RRC_INACTIVE. In some implementations, in RRC_INACTIVE, 5GC-NG-RAN connection (both C/U-planes) is established for UE, and the UE AS context is stored in NG-RAN and the UE. The NG-RAN may know the RNA which the UE belongs to.

The NAS layer is implemented above the RRC layer, as shown in the example of FIG. 3. The NAS control protocol performs various functions, such as, for example, authentication, mobility management, security control, etc.

Physical channels, for example as utilized by the PHY layer, may be modulated according to various modulation techniques utilizing time and frequency as radio resources. For example, the physical channels may consist of a plurality of orthogonal frequency division multiplexing (OFDM) symbols in time domain and a plurality of subcarriers in frequency domain. A subframe may be implemented, which consists of a plurality of OFDM symbols in the time domain. A resource block may be implemented as a resource allocation unit, and each resource block may consist of a plurality of OFDM symbols and a plurality of subcarriers. In addition, each subframe may use specific subcarriers of specific OFDM symbols (e.g., the first OFDM symbol) of the corresponding subframe for a specific purpose, such as for a physical downlink control channel (PDCCH), e.g., an L1/L2 control channel. A transmission time interval (TTI) may be implemented as a basic unit of time, for example as used by a scheduler for resource allocation. The TTI may be defined in units of one or a plurality of slots, or may be defined in units of mini-slots.

Transport channels may be classified according to how and with what characteristics data are transferred over the radio interface. For example, DL transport channels include a broadcast channel (BCH) used for transmitting system information, a downlink shared channel (DL-SCH) used for transmitting user traffic or control signals, and a paging channel (PCH) used for paging a UE. As another example, UL transport channels include an uplink shared channel (UL-SCH) for transmitting user traffic or control signals and a random access channel (RACH) normally used for initial access to a cell.

Different kinds of data transfer services may be offered by the MAC sublayer. Different logical channel types may be defined by what type of information is transferred. In some implementations, logical channels may be classified into two groups: control channels and traffic channels.

Control channels are used for the transfer of control plane information only, according to some implementations. The control channels may include, for example, a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. In some implementations, the CCCH is used for UEs having no RRC connection with the network. The DCCH is a point-to-point bi-directional channel that transmits dedicated control information between a UE and the network. In some implementations, the DCCH is used by UEs having an RRC connection.

Traffic channels are used for the transfer of user plane information only, according to some implementations. The traffic channels include, for example, a dedicated traffic channel (DTCH). The DTCH is a point-to-point channel, dedicated to one UE, for the transfer of user information. In some implementations, the DTCH can exist in both UL and DL.

In some scenarios, mappings may be implemented between the logical channels and transport channels. For example, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. As another example, in UL, CCCH can be mapped to UL-SCH, DCCH can be mapped to UL-SCH, and DTCH can be mapped to UL-SCH.

Figure 4:
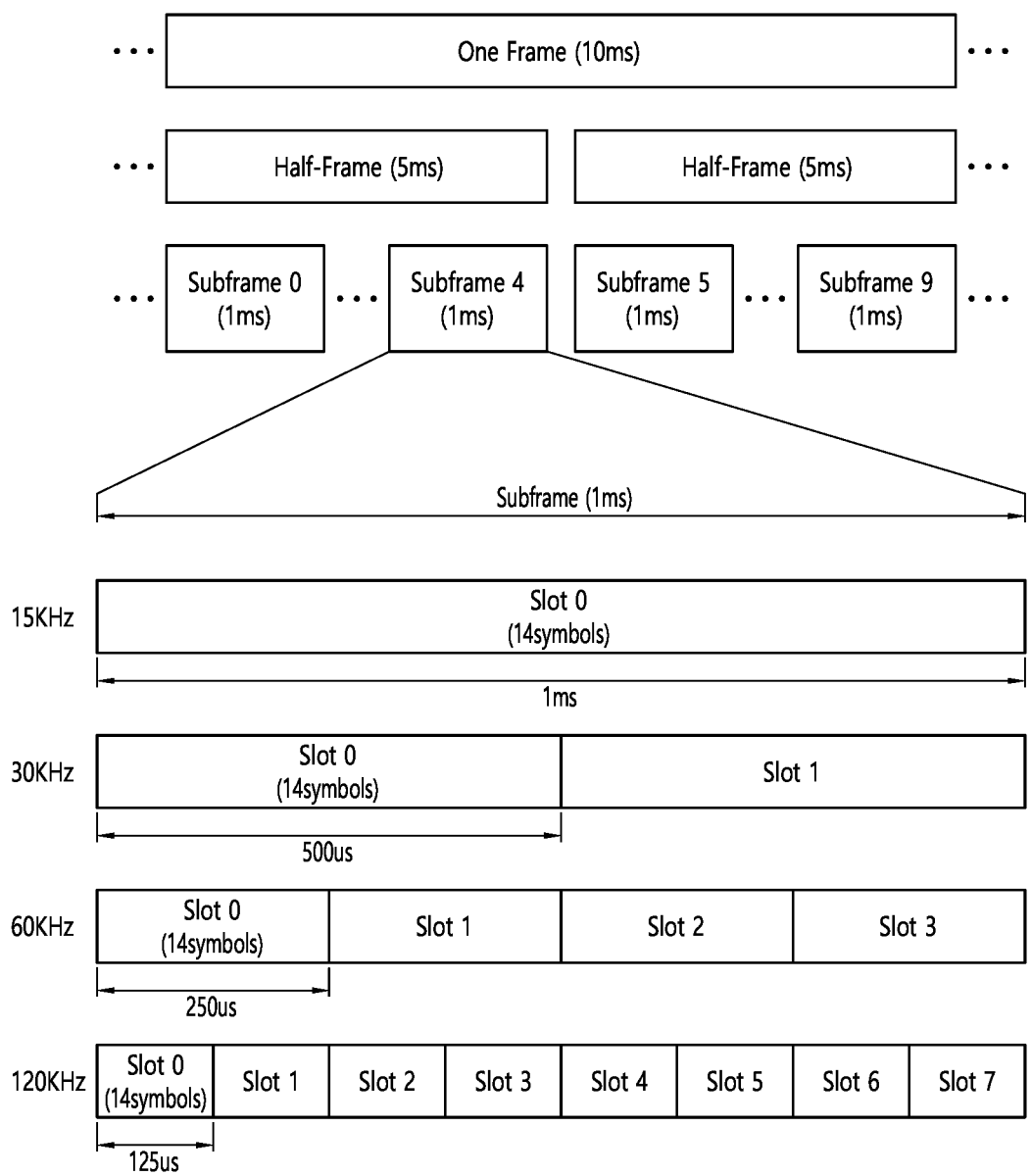
FIG. 4 shows a frame structure in a 3GPP based wireless communication system to which implementations of the present disclosure can be applied.

FIG. 4 shows a frame structure in a 3GPP based wireless communication system to which implementations of the present disclosure can be applied.

The frame structure shown in FIG. 4 is purely exemplary and the number of subframes, the number of slots, and/or the number of symbols in a frame may be variously changed. In the 3GPP based wireless communication system, OFDM numerologies (e.g., subcarrier spacing (SCS), TTI duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 4, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N_{symb}^{slot}$ | $N_{slot}^{frame,u}$ | $N_{slot}^{subframe,u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N_{symb}^{slot}$, the number of slots per frame $N_{slot}^{frame,u}$, and the number of slots per subframe $N_{slot}^{subframe,u}$ for the extended CP, according to the subcarrier spacing $\Delta f = 2^u \ast 15$ kHz.

TABLE 2

| u | $N_{symb}^{slot}$ | $N_{slot}^{frame,u}$ | $N_{slot}^{subframe,u}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N_{grid,x}^{size,u} \ast N_{sc}^{RB}$ subcarriers and $N_{symb}^{subframe,u}$ OFDM symbols is defined, starting at common resource block (CRB) $N_{grid}^{start,u}$ indicated by higher-layer signaling (e.g., RRC signaling), where $N_{grid,x}^{size,u}$ is the number of resource blocks (RBs) in the resource grid and the subscript x is DL for downlink and UL for uplink. $N_{sc}^{RB}$ is the number of subcarriers per RB. In the 3GPP based wireless communication system, $N_{sc}^{RB}$ is 12 generally. There is one resource grid for a given antenna port p, subcarrier spacing configuration u, and transmission direction (DL or UL). The carrier bandwidth $N_{grid}^{size,u}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N_{BWP,i}^{size}-1$, where i is the number of the bandwidth part. The relation between the physical resource block $n_{PRB}$ in the bandwidth part i and the common resource block $n_{CRB}$ is as follows: $n_{PRB}=n_{CRB}+N_{BWP,i}^{size}$, where $N_{BWP,i}^{size}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 5:
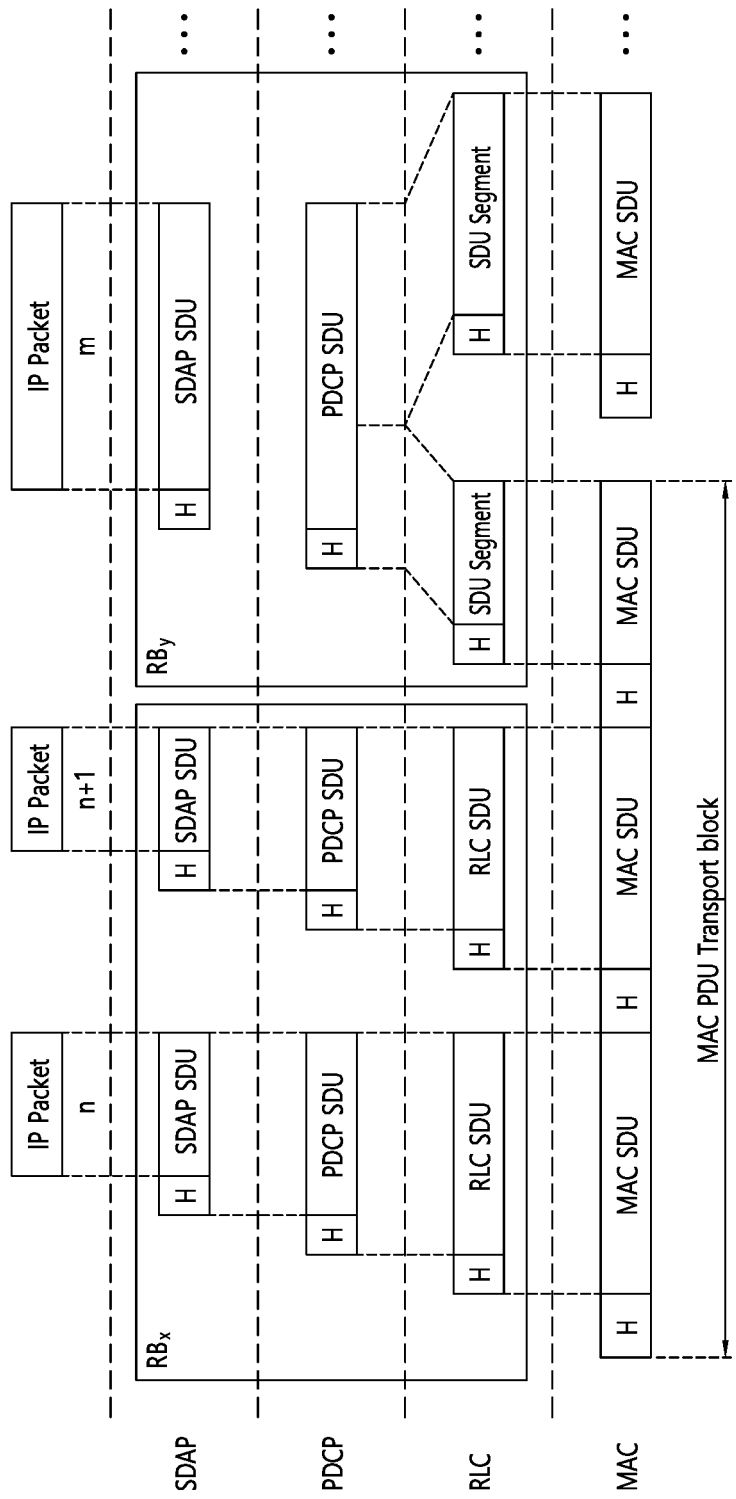
FIG. 5 shows a data flow example in the 3GPP NR system to which implementations of the present disclosure can be applied.

FIG. 5 shows a data flow example in the 3GPP NR system to which implementations of the present disclosure can be applied.

Referring to FIG. 5, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Figure 6:
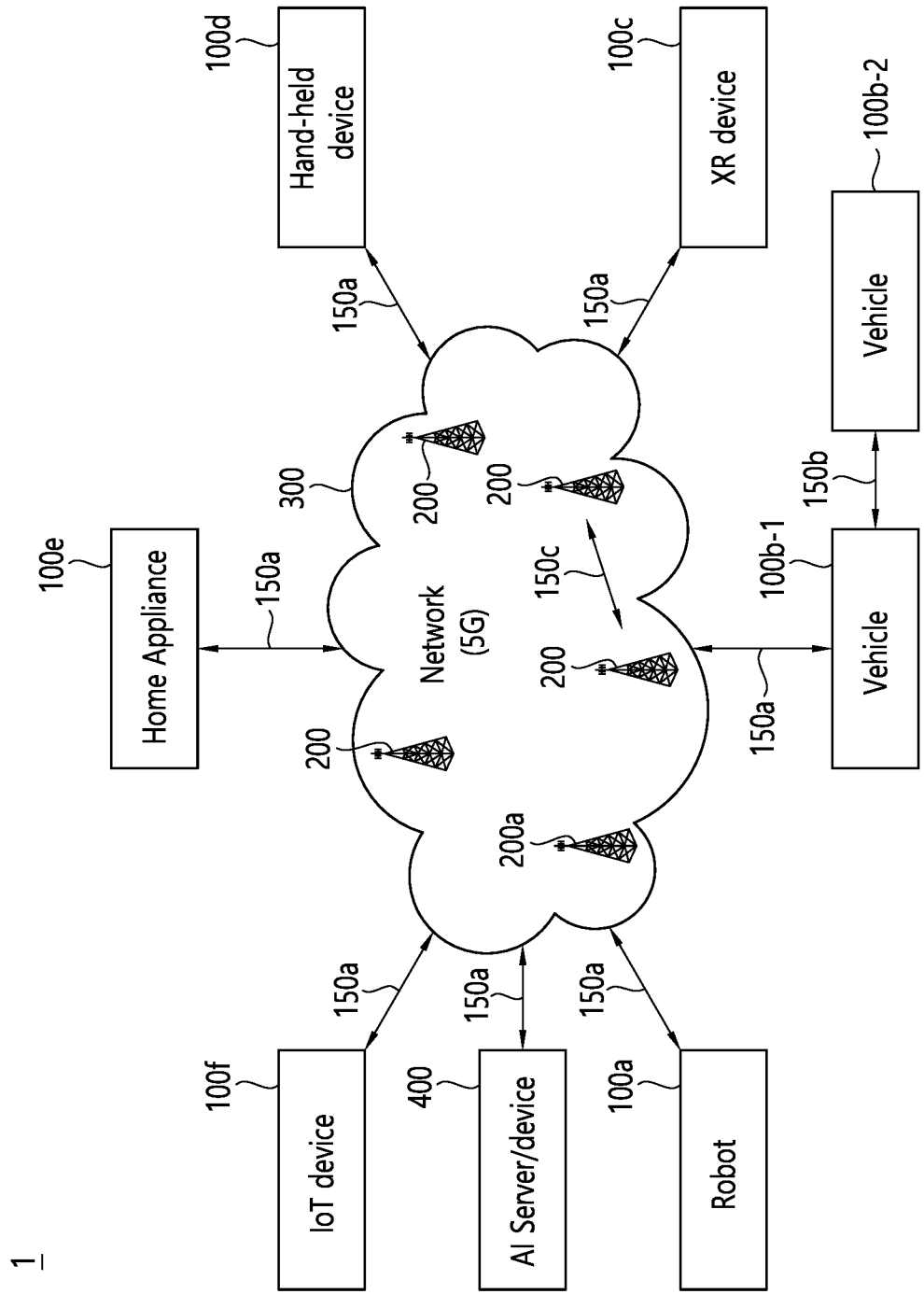
FIG. 6 shows an example of a communication system to which implementations of the present disclosure can be applied.

FIG. 6 shows an example of a communication system to which implementations of the present disclosure can be applied.

The 5G usage scenarios shown in FIG. 6 are only exemplary, and the technical features of the present disclosure can be applied to other 5G usage scenarios which are not shown in FIG. 6.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FITH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 6, the communication system 1 includes wireless devices 100a to 100f, base stations (BSs) 200, and a network 300. Although FIG. 6 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 7:
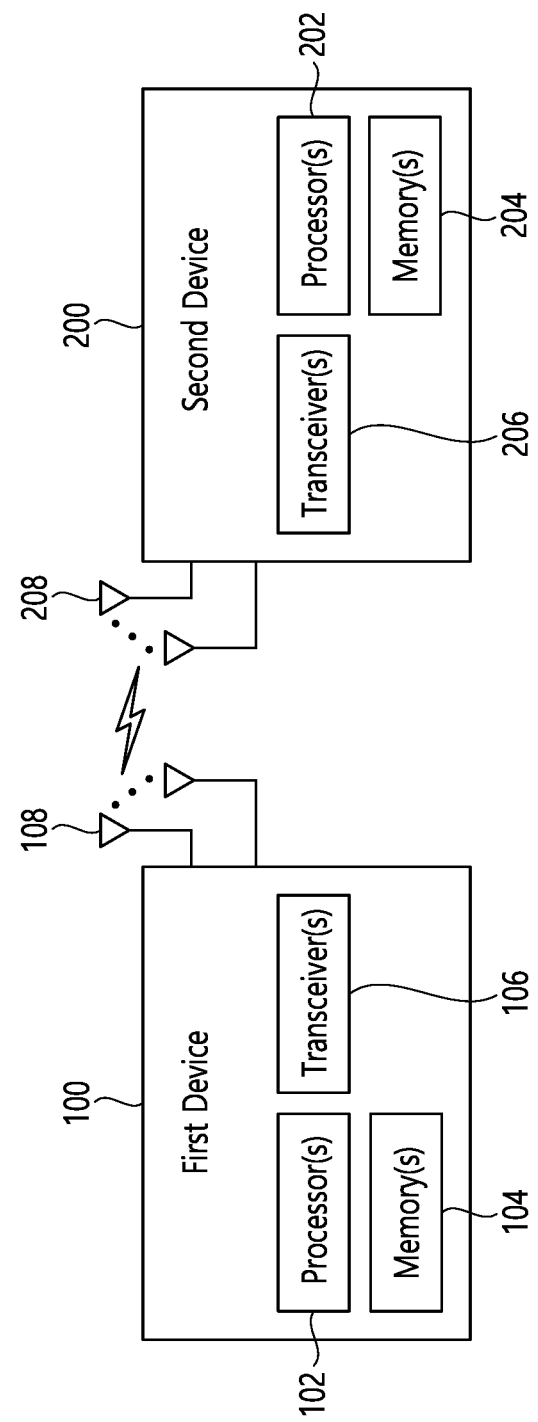
FIG. 7 shows an example of wireless devices to which implementations of the present disclosure can be applied.

FIG. 7 shows an example of wireless devices to which implementations of the present disclosure can be applied.

Referring to FIG. 7, a first wireless device 100 and a second wireless device 200 may transmit/receive radio signals to/from an external device through a variety of RATs (e.g., LTE and NR). In FIG. 7, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 6.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as anode B (NB), an eNode B (eNB), or a gNB.

Figure 8:
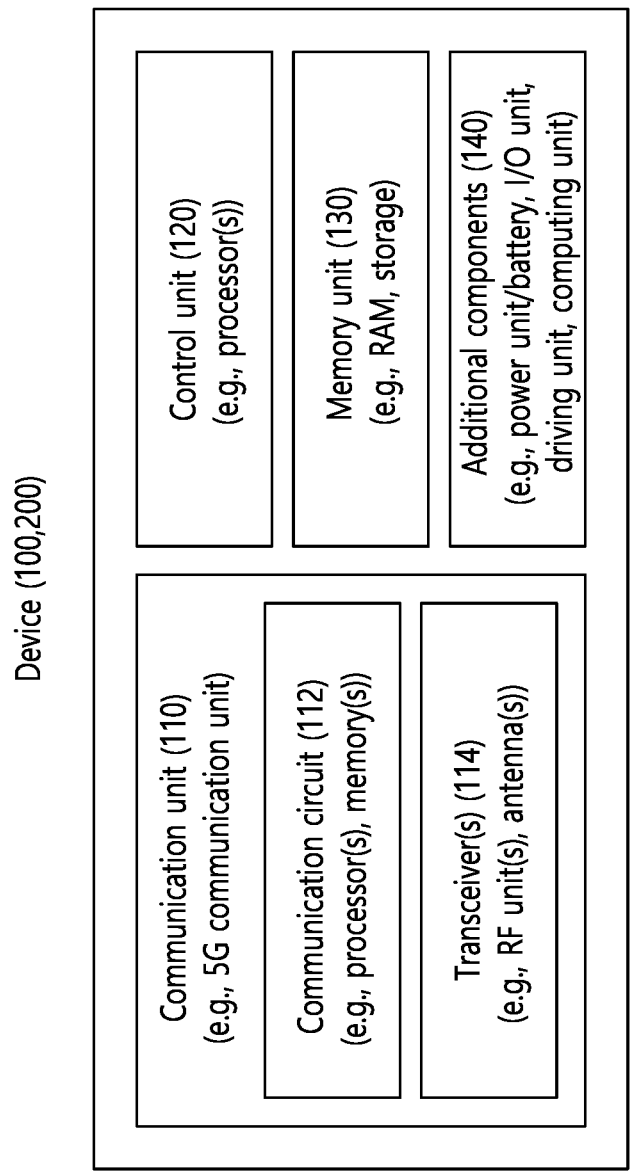
FIG. 8 shows an example of a wireless device to which implementations of the present disclosure can be applied.

FIG. 8 shows an example of a wireless device to which implementations of the present disclosure can be applied.

The wireless device may be implemented in various forms according to a use-case/service (refer to FIG. 6).

Referring to FIG. 8, wireless devices 100 and 200 may correspond to the wireless devices 100 and 200 of FIG. 7 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 7 and/or the one or more memories 104 and 204 of FIG. 7. For example, the transceiver(s) 114 may include the one or more transceivers 106 and 206 of FIG. 7 and/or the one or more antennas 108 and 208 of FIG. 7. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 6), the vehicles (100b-1 and 100b-2 of FIG. 6), the XR device (100c of FIG. 6), the hand-held device (100d of FIG. 6), the home appliance (100e of FIG. 6), the IoT device (100f of FIG. 6), a digital broadcast terminal, a hologram device, a public safety device, an MTC device, a medicine device, a FinTech device (or a finance device), a security device, a climate/environment device, the AI server/device (400 of FIG. 6), the BSs (200 of FIG. 6), a network node, etc. The wireless devices 100 and 200 may be used in a mobile or fixed place according to a use-example/service.

In FIG. 8, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 9:
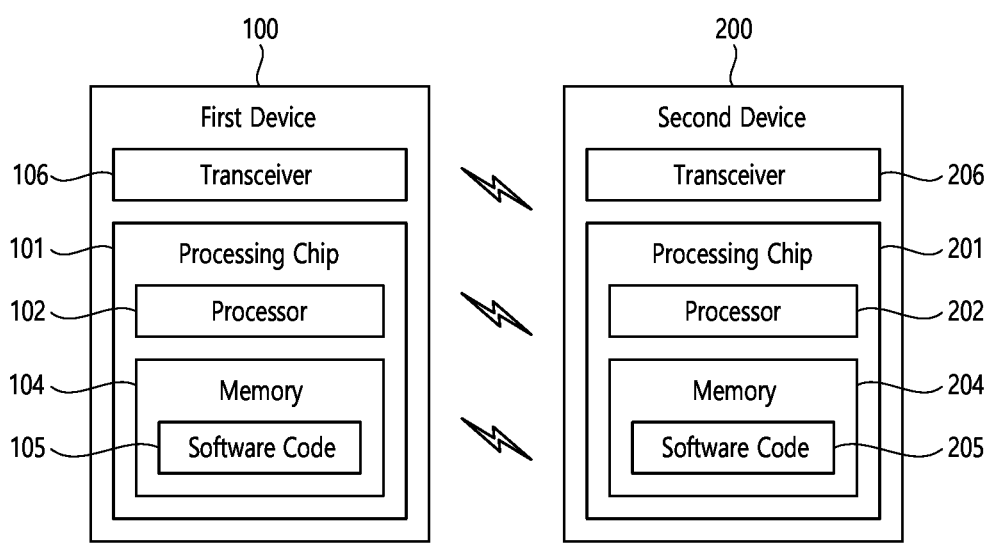
FIG. 9 shows another example of wireless devices to which implementations of the present disclosure can be applied.

FIG. 9 shows another example of wireless devices to which implementations of the present disclosure can be applied.

Referring to FIG. 9, wireless devices 100 and 200 may correspond to the wireless devices 100 and 200 of FIG. 7 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 10:
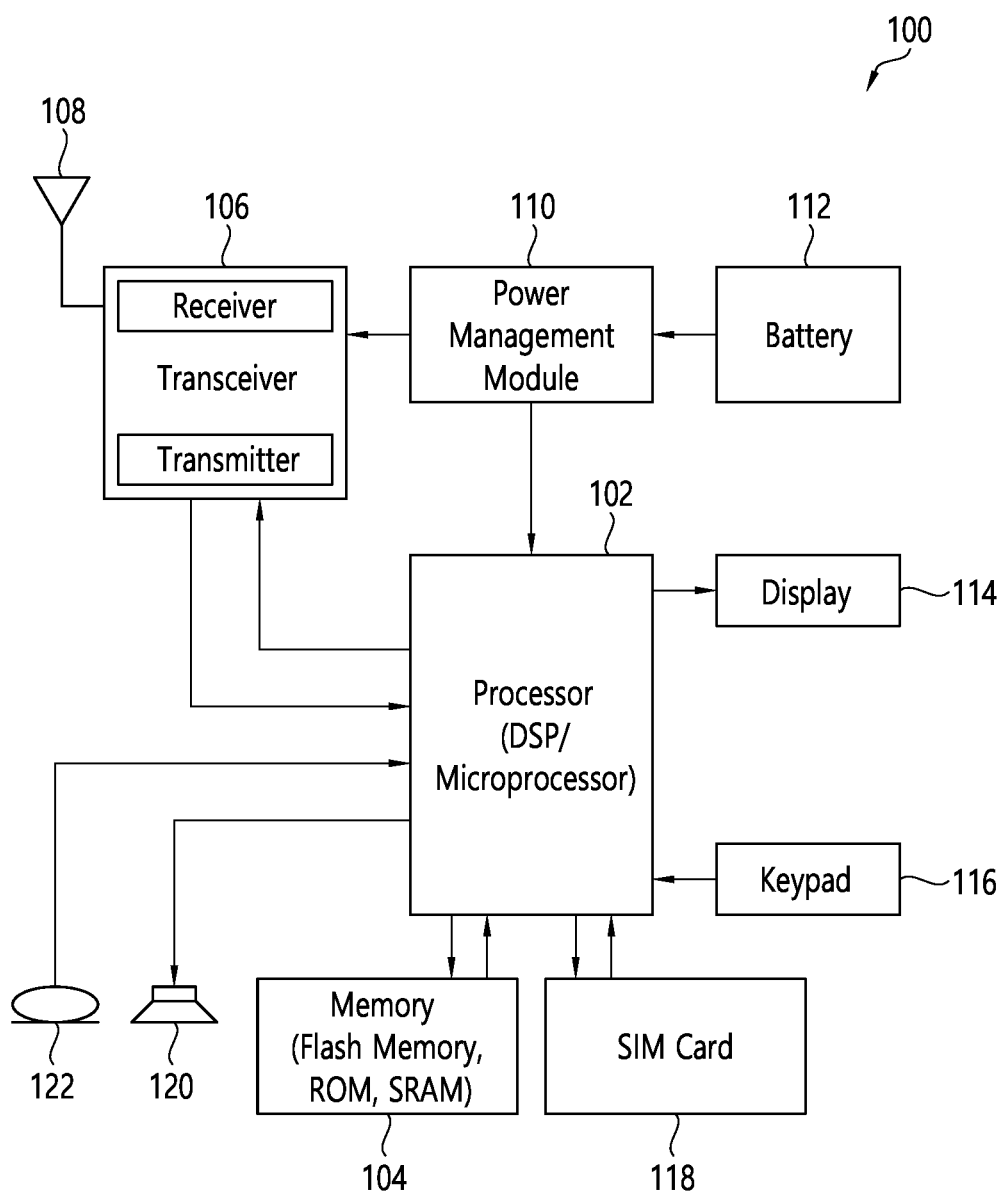
FIG. 10 shows an example of UE to which implementations of the present disclosure can be applied.

FIG. 10 shows an example of UE to which implementations of the present disclosure can be applied.

Referring to FIG. 10, a UE 100 may correspond to the first wireless device 100 of FIG. 7 and/or the first wireless device 100 of FIG. 9.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Support for vehicle-to-vehicle (V2V) and vehicle-to-everything (V2X) services has been introduced in LTE during Releases 14 and 15, in order to expand the 3GPP platform to the automotive industry. These work items defined an LTE sidelink suitable for vehicular applications, and complementary enhancements to the cellular infrastructure.

Further to this work, requirements for support of enhanced V2X use cases have been defined in 5G LTE/NR, which are broadly arranged into four use case groups:

1) Vehicles platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

NR sidelink (SL) unicast, groupcast, and broadcast design is described. SL broadcast, groupcast, and unicast transmissions are supported for the in-coverage, out-of-coverage and partial-coverage scenarios.

Figure 11:
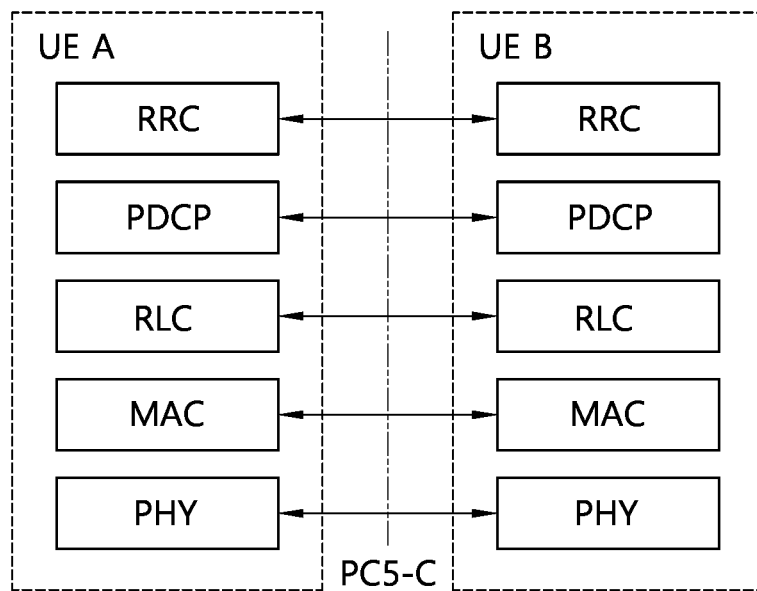
FIGS. 11 and 12 show an example of PC5 protocol stacks to which implementations of the present disclosure is applied.
Figure 12:
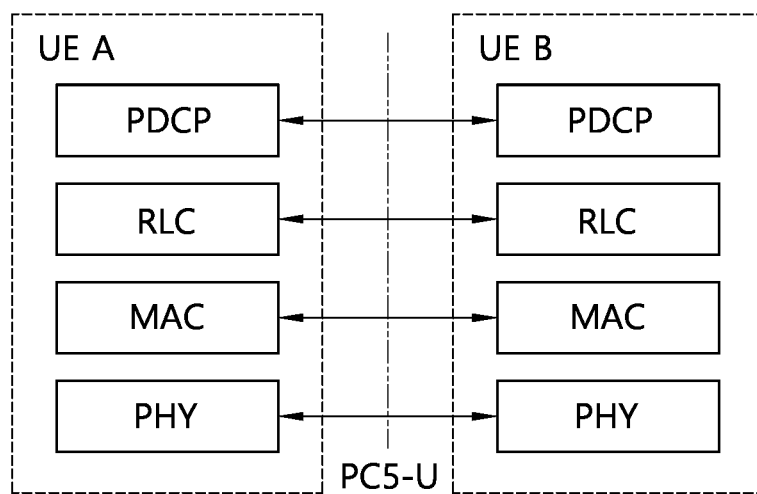

FIGS. 11 and 12 show an example of PC5 protocol stacks to which implementations of the present disclosure is applied.

FIG. 11 illustrates an example of a PC5 control plane (PC5-C) protocol stack between UEs. The AS protocol stack for the control plane in the PC5 interface consists of at least RRC, PDCP, RLC and MAC sublayers, and the physical layer.

FIG. 12 illustrates an example of a PC5 user plane (PC5-U) protocol stack between UEs. The AS protocol stack for user plane in the PC5 interface consists of at least PDCP, RLC and MAC sublayers, and the physical layer.

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following identities is known to the physical layer:
- The layer-1 destination ID, conveyed via physical sidelink control channel (PSCCH)
- Additional layer-1 ID(s), conveyed via PSCCH, at least for the purpose of identifying which transmissions can be combined in reception when HARQ feedback is in use
- HARQ process ID For the purpose of Layer 2 analysis, it is assumed that upper layers (i.e., above AS) provide the information on whether it is a unicast, groupcast or broadcast transmission for a particular data transfer. For the unicast and groupcast transmission in SL, the following identities is known to Layer 2:
- Unicast: destination ID, source ID
- Groupcast: destination group ID, source ID Discovery procedure and related messages for the unicast and groupcast transmission are up to upper layers.

At least the following two SL resource allocation modes are defined as follows.

(1) Mode 1: BS schedules SL resource(s) to be used by UE for SL transmission(s).

(2) Mode 2: UE determines, i.e., BS does not schedule, SL transmission resource(s) within SL resources configured by BS/network or pre-configured SL resources.

The definition of SL resource allocation Mode 2 covers:
a) UE autonomously selects SL resource for transmission
b) UE assists SL resource selection for other UE(s)
c) UE is configured with NR configured grant (Type-1 like) for SL transmission
d) UE schedules SL transmissions of other UEs For SL resource allocation Mode 2, sensing and resource (re-)selection-related procedures may be considered. The sensing procedure considered is defined as decoding sidelink control information (SCI) from other UEs and/or SL measurements. The resource (re-)selection procedure considered uses the results of the sensing procedure to determine resource(s) for SL transmission.

For Mode 2(a), SL sensing and resource selection procedures may be considered in the context of a semi-persistent scheme where resource(s) are selected for multiple transmissions of different TBs and a dynamic scheme where resource(s) are selected for each TB transmission.

The following techniques may be considered to identify occupied SL resources:
- Decoding of SL control channel transmissions
- SL measurements
- Detection of SL transmissions The following aspects may be considered for SL resource selection:
- How a UE selects resource for PSCCH and physical sidelink shared channel (PSSCH) transmission (and other SL physical channel/signals that are defined)
- Which information is used by UE for resource selection procedure Mode 2(b) is a functionality that can be part of Mode 2(a), (c), (d) operation.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For Mode 2(d), the procedures to become or serve as a scheduling UE for in-coverage and out-of-coverage scenarios may be considered as follows:
- Scheduling UE is configured by gNB
- Application layer or pre-configuration selects scheduling UE
- Receiver UE schedules transmissions of the transmitter UE during the session
- Scheduling UE is decided by multiple UEs including the one that is finally selected. The UE may autonomously decide to serve as a scheduling UE/offer scheduling UE functions (i.e., by self-nomination).

Until Rel-15, broadcast transmission is supported only for V2X communication. Broadcast transmission means that V2X transmission by one wireless device is broadcast to several unspecified wireless devices. In case of NR V2X, unicast and groupcast transmission may also be supported for V2X communication as well as broadcast transmission. Unicast transmission means that V2X transmission by one wireless device is transmitted to one specified other wireless device. Groupcast transmission means that V2X transmission by one wireless device is transmitted to several specified other wireless devices which belongs to a group. Unicast transmission is expected to be used for high reliability and low latency cases, e.g., extended sensor sharing and remote driving, emergency, etc.

In NR V2X, one wireless device may establish a PC5 link (e.g., one-to-one connection and/or session between wireless devices) for unicast service with another wireless device. PC5 Signaling protocol above RRC layer in the wireless devices may be used for unicast link establishment and management. Based on the unicast link establishment and management, the wireless devices may exchange PC5 signaling (i.e., upper layer signaling than RRC signaling) to successfully or unsuccessfully establish a unicast link with security activation or release the established unicast link.

Hereinafter, Physical uplink control channel is described. Section 5.2.3 of 3GPP TS 36.300 V15.6.0 can be referred.

The PUCCH/SPUCCH shall be mapped to a control channel resource in the uplink.

Depending on presence or absence of uplink timing synchronization, the uplink physical control signalling for scheduling request can differ.

In the case of time synchronization being present for the pTAG, the outband control signalling consists of:

CSI;

ACK/NAK;

Scheduling Request (SR).

The CSI informs the scheduler about the current channel conditions as seen by the UE. If MIMO transmission is used, the CSI includes necessary MIMO-related feedback.

The HARQ feedback in response to downlink data transmission consists of a single ACK/NAK bit per transport block in case of non-bundling configuration.

PUCCH/SPUCCH resources for SR, CSI reporting and possibly HARQ feedback are assigned and can be revoked through RRC signalling. An SR is not necessarily assigned to UEs acquiring synchronization through the RACH (i.e. synchronised UEs may or may not have a dedicated SR channel). PUCCH/SPUCCH resources for SR, CSI and HARQ feedback are lost when the UE is no longer synchronized.

PUCCH/SPUCCH is transmitted on PCell, PUCCH SCell (if such is configured in CA) and on PSCell (in DC).

The physical layer supports simultaneous transmission of PUCCH and subframe PUSCH, or of SPUCCH and (sub) slot-PUSCH. In case of SPUCCH and (sub)slot-PUSCH transmission, both the shared channel and the associated control channel shall be of the same transmission duration (slot or subslot).

Hereinafter, Resource allocation is described. It may be referred to as Section 5.3 of 3GPP TS 38.885 V16.0.0.

The study defines at least the following two SL resource allocation modes:

Mode 1: BS schedules SL resource(s) to be used by UE for SL transmission(s).

Mode 2: UE determines, i.e. BS does not schedule, SL transmission resource(s) within SL resources configured by BS/network or pre-configured SL resources.

The definition of SL resource allocation Mode 2 covers:

a) UE autonomously selects SL resource for transmission b) UE assists SL resource selection for other UE(s), a functionality which can be part of a), c), d)

c) UE is configured with NR configured grant (Type-1 like) for SL transmission d) UE schedules SL transmissions of other UEs Resource allocation Mode 2 is described.

Resource allocation Mode 2 supports reservation of SL resources at least for blind retransmission.

Sensing and resource (re-)selection is described.

Sensing- and resource (re-)selection-related procedures are supported for resource allocation Mode 2.

The sensing procedure considered is defined as decoding SCI(s) from other UEs and/or SL measurements. Decoding SCI(s) in this procedure provides at least information on SL resources indicated by the UE transmitting the SCI. The sensing procedure uses a L1 SL RSRP measurement based on SL DMRS when the corresponding SCI is decoded.

The resource (re-)selection procedure considered uses the results of the sensing procedure to determine resource(s) for SL transmission.

Mode 2(a) is described.

The study considers SL sensing and resource selection procedures for Mode 2(a), in the context of a semi-persistent scheme where resource(s) are selected for multiple transmissions of different TBs and a dynamic scheme where resource(s) are selected for each TB transmission.

The following techniques are studied to identify occupied SL resources:

Decoding of SL control channel transmissions

SL measurements

Detection of SL transmissions

The following aspects are studied for SL resource selection

How a UE selects resource for PSCCH and PSSCH transmission (and other SL physical channel/signals that are defined)

Which information is used by UE for resource selection procedure

Mode 2(c) is described.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A 'pattern' is defined by the size and position(s) of the resource in time and frequency, and the number of resources.

Mode 2(d) is described.

In the context of group-based SL communication, it supported for UE-A to inform its serving gNB about members UE-B, UE-C, and so on of a group, and for the gNB to provide individual resource pool configurations and/or individual resource configurations to each group member through UE-A. UE-A cannot modify the configurations, and there is no direct connection required between any member UE and the gNB. Higher-layer only signalling is used to provide the configurations. Such functionality is up to UE capability(ies).

Hereinafter, Random Access Channel (RACH) procedure in NR is described.

For NR, RACH can be configured either 2-step RACH or 4-step RACH.

For 4-step RACH, UE transmits a RACH preamble, receives Random Access Response MAC CE, transmits a message 3 on PUSCH, and receive Contention Resolution MAC CE.

For 2-step RACH, UE transmits a message A consisting of a RACH preamble and PUSCH resource, and receives a message B consisting of Random Access Response and Contention Resolution.

Meanwhile, the Sidelink Channel Status Information (SL CSI) reporting procedure is used to provide a peer UE with sidelink channel status such as CQI and RI.

However, there are some cases that a proper sidelink resource is not allocated for the triggered SL CSI reporting procedure.

Therefore, studies for selecting a sidelink resource for a sidelink CSI reporting in a wireless communication system are required.

Hereinafter, a method and apparatus for selecting a sidelink resource for a sidelink CSI reporting in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 13:
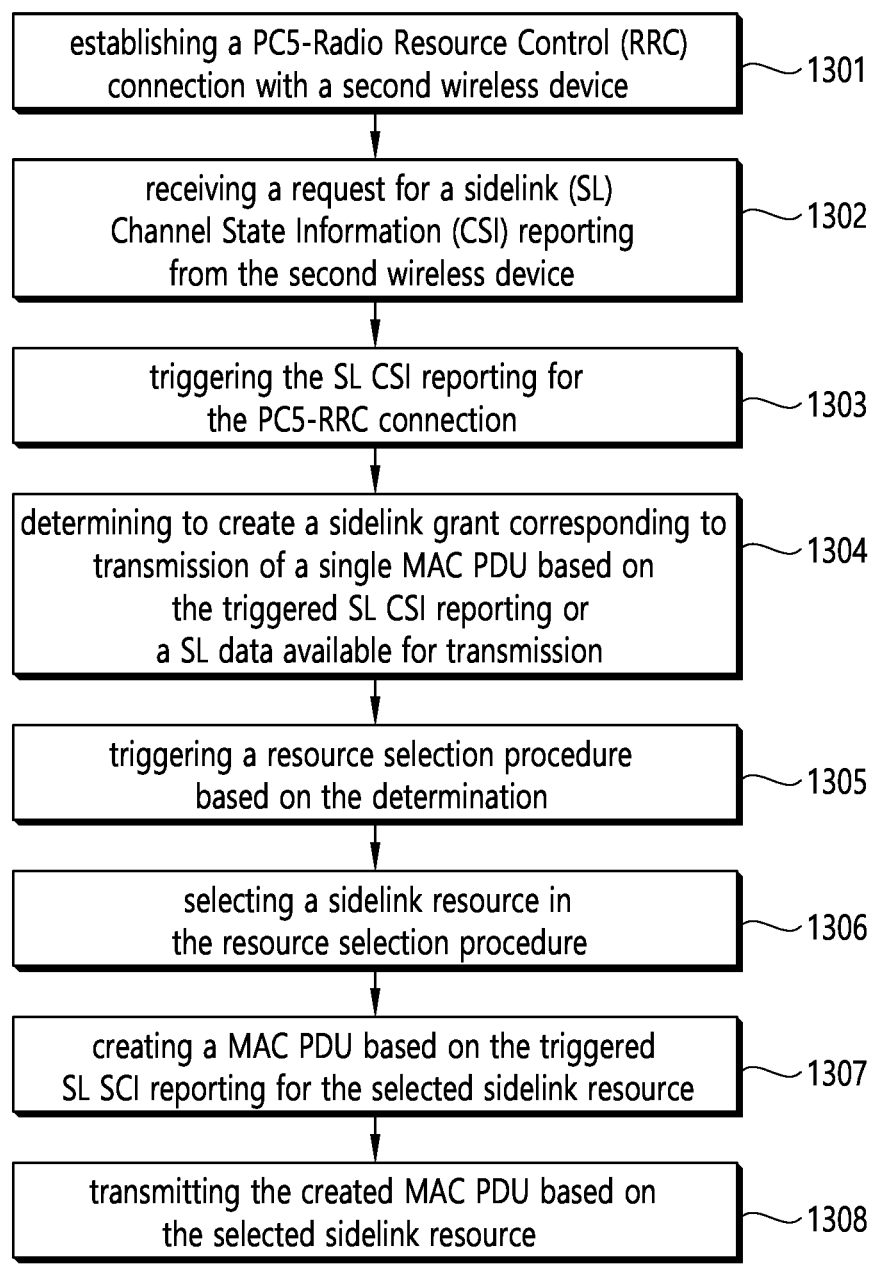
FIG. 13 shows an example of a method for selecting a sidelink resource for a sidelink CSI reporting in a wireless communication system, according to some embodiments of the present disclosure.

FIG. 13 shows an example of a method for selecting a sidelink resource for a sidelink CSI reporting in a wireless communication system, according to some embodiments of the present disclosure.

In particular, FIG. 13 shows an example of a method performed by a wireless device.

In step 1301, a first wireless device may establish a PC5-Radio Resource Control (RRC) connection with a second wireless device.

For example, a first wireless device may configure sidelink resource allocation mode 2 for transmission using at least one of pools of resources in a carrier.

In step 1302, a first wireless device may receive a request for a sidelink (SL) Channel State Information (CSI) reporting from the second wireless device.

For example, the request for the SL CSI reporting may include a Sidelink Control Information transmitted via a Physical Sidelink Control Channel (PSCCH) and/or a Physical Sidelink Shared Channel (PSSCH).

For example, a MAC entity of the first wireless device may monitor a PSCCH for each PSCCH duration to receive a first stage SCI. If a first stage SCI has been received on the PSCCH, the MAC entity may determine the set of PSSCH duration to receive a second stage SCI. If the second stage SCI for this PSSCH has been received on the PSSCH, the MAC entity may store the SCI as a valid SCI.

In step 1303, a first wireless device may trigger the SL CSI reporting for the PC5-RRC connection;

For example, the first wireless device may trigger the first SL CSI upon receiving the request for first SL CSI reporting from the second wireless device.

For example, wherein the SL CSI reporting is triggered for a pair of a Source ID for the first wireless device and a Destination ID for the second wireless device corresponding to the PC5-RRC connection.

In step 1304, a first wireless device may determine to create a sidelink grant corresponding to transmission of a single MAC PDU based on the triggered SL CSI reporting or a SL data available for transmission.

For example, a first wireless device may check if a MAC entity has selected to create a selected sidelink grant corresponding to transmission(s) of a single MAC PDU, and if SL data is available in a logical channel.

For other example, a first wireless device may check if a MAC entity has selected to create a selected sidelink grant corresponding to transmission(s) of a single MAC PDU, and a SL-CSI reporting is triggered.

In step 1305, a first wireless device may trigger a resource selection procedure based on the determination.

According to some embodiments of the present disclosure, if a MAC entity has selected to create a selected sidelink grant corresponding to transmission(s) of a single MAC PDU, and if SL data is available in a logical channel, a first wireless device may trigger a resource selection procedure.

For example, based on that the SL data in a logical channel is available for transmission, a first wireless device may determine whether the Hybrid Automatic Repeat Request (HARQ) feedback is enabled for the logical channel or not.

For example, based on that the HARQ feedback is enabled for the logical channel, a first wireless device may select the sidelink resource among a pool of resources configured with Physical Sidelink Feedback Channel (PSFCH) resources.

According to some embodiments of the present disclosure, if a MAC entity has selected to create a selected sidelink grant corresponding to transmission(s) of a single MAC PDU, and a SL-CSI reporting is triggered, a first wireless device may trigger a resource selection procedure.

In step 1306, a first wireless device may select a sidelink resource in the resource selection procedure.

According to some embodiments of the present disclosure, in the resource selection procedure, a first wireless device may select a pool of resources in a carrier. A first wireless device may perform a resource selection check procedure on the selected pool of resources.

For example, in the resource selection check procedure, a first wireless device may select the sidelink resource in the pool of resources. A first wireless device may allocate the selected sidelink resource for a sidelink grant.

For example, in the resource selection check procedure, a first wireless device may reselect a sidelink resource based on that the sidelink grant does not fulfil a latency requirement of a data in a logical channel.

For example, a first wireless device may use the sidelink grant to determine Physical Sidelink Control Channel (PSCCH) duration and Physical Sidelink Shared Channel (PSSCH) duration.

In step 1307, a first wireless device may create a MAC PDU based on the triggered SL SCI reporting for the selected sidelink resource.

For example, a MAC entity of the first wireless device may instruct the Multiplexing and Assembly procedure to generate a Sidelink CSI Reporting MAC CE.

For example, the generated MAC CE may include a Channel Quality Indicator (CQI) for the first PC5-RRC connection. For example, the generated MAC CE may include a Rank Indicator (RI) for sidelink CSI reporting and the CQI.

For example, a size of the generated MAC CE may be an Octet. For example, the generated MAC CE may include 1 bit of the RI and 4 bit of CQI.

For example, the MAC PDU may be created based on the sidelink grant associated with the selected sidelink resource in step 1306.

In step 1308, a first wireless device may transmit the created MAC PDU based on the selected sidelink resource.

For example, the first wireless device may transmit the generated MAC CE to the second wireless device after generating a MAC CE for the first SL CSI reporting.

For example, the first wireless device may transmit the created MAC PDU based on the determined PSCCH duration and the determined PSSCH duration in step 1306.

According to some embodiments of the present disclosure, a first wireless device may be in communication with at least one of a user equipment, a network, or an autonomous vehicle other than the first wireless device.

Figure 14:
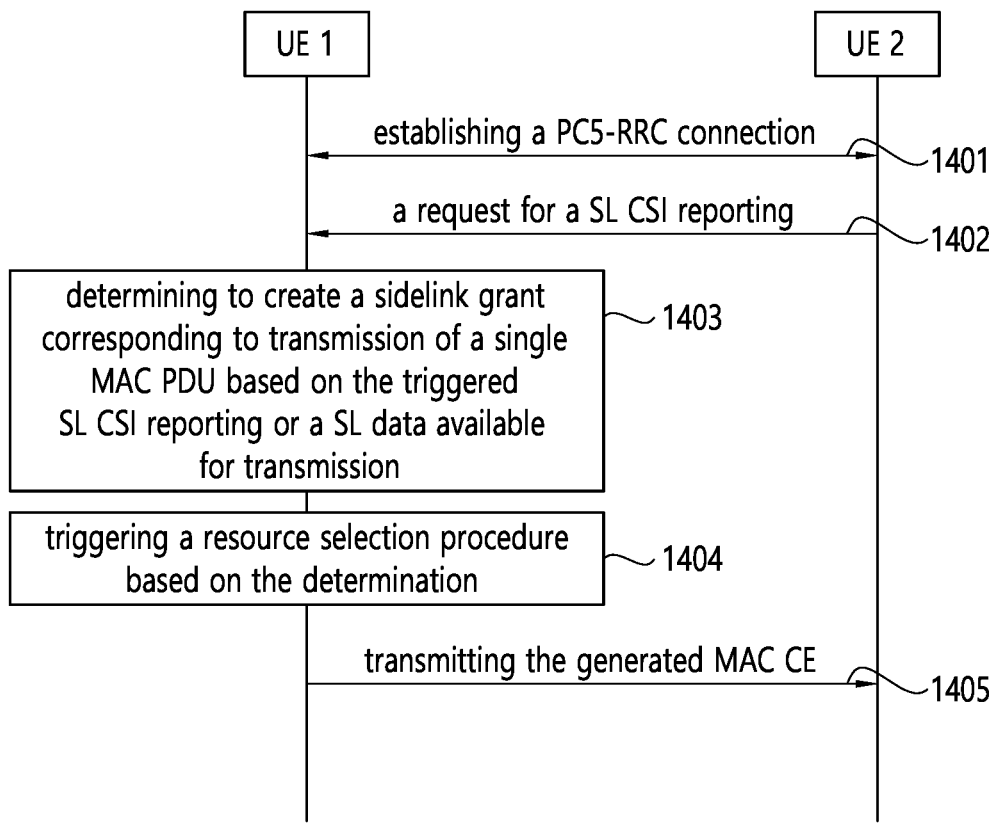
FIG. 14 shows an example of SL CSI reporting performed by a first UE in a wireless communication system, according to some embodiments of the present disclosure.

FIG. 14 shows an example of SL CSI reporting performed by a first UE in a wireless communication system, according to some embodiments of the present disclosure.

In step 1401, the first UE may establish a PC5-RRC connection with a second wireless device.

In step 1402, the first UE may receive a request for a SL CSI reporting from the second wireless device.

For example, upon receiving the request for the SL CSI reporting, the first UE may trigger the SL CSI reporting for the PC5-RRC connection.

In step 1403, the first UE may determine to create a sidelink grant corresponding to transmission of a single MAC PDU based on the triggered SL CSI reporting or a SL data available for transmission.

In step 1404, the first UE may trigger a resource selection procedure based on the determination.

The first UE may select a sidelink resource in the resource selection procedure.

The first UE may create a MAC PDU based on the triggered SL SCI reporting for the selected sidelink resource.

In step 1405, the first UE may transmit the created MAC PDU based on the selected sidelink resource.

Hereinafter, a method for selecting a sidelink resource for a sidelink CSI reporting in a wireless communication system, according to some embodiments of the present disclosure will be described. The method may be performed by a wireless device, for example, a UE.

According to some embodiments of the present disclosure, a UE may perform SL Grant reception and SCI transmission.

Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant.

If the MAC entity has been configured with Sidelink resource allocation mode 1, the MAC entity shall for each PDCCH occasion and for each grant received for this PDCCH occasion:

1> if a sidelink grant has been received on the PDCCH for the MAC entity's SL-RNTI:
2> if the NDI received on the PDCCH has been not toggled compared to the value in the previously received HARQ information for the HARQ Process ID:
3> use the received sidelink grant to determine PSCCH duration(s) and PSSCH duration(s) for one or more retransmissions of a single MAC PDU for the corresponding Sidelink process.
2> else:
3> use the received sidelink grant to determine PSCCH duration(s) and PSSCH duration(s) for initial transmission and, if available, retransmission(s) of a single MAC PDU.
2> if a sidelink grant is available for retransmission(s) of a MAC PDU which has been positively acknowledged:
3> clear the PSCCH duration(s) and PSSCH duration(s) corresponding to retransmission(s) of the MAC PDU from the sidelink grant.
1> else if a sidelink grant has been received on the PDCCH for the MAC entity's SLCS-RNTI:
2> if PDCCH contents indicate retransmission(s) for the identified HARQ process ID that has been set for an activated configured sidelink grant identified by sl-ConfigIndexCG:
3> use the received sidelink grant to determine PSCCH duration(s) and PSSCH duration(s) for one or more retransmissions of a single MAC PDU.
2> else if PDCCH contents indicate configured grant Type 2 deactivation for a configured sidelink grant:
3> clear the configured sidelink grant, if available;
3> trigger configured sidelink grant confirmation for the configured sidelink grant.
2> else if PDCCH contents indicate configured grant Type 2 activation for a configured sidelink grant:
3> trigger configured sidelink grant confirmation for the configured sidelink grant;
3> store the configured sidelink grant;
3> initialise or re-initialise the configured sidelink grant to determine the set of PSCCH durations and the set of PSSCH durations for transmissions of multiple MAC.

If the MAC entity has been configured with Sidelink resource allocation mode 2 to transmit using pool(s) of resources in a carrier based on sensing or random selection, the MAC entity shall for each Sidelink process:

If the MAC entity is configured with Sidelink resource allocation mode 2 to transmit using a pool of resources in a carrier, the MAC entity can create a selected sidelink grant on the pool of resources based on random selection or sensing only after releasing configured sidelink grant(s), if any.

The MAC entity expects that PSFCH is always configured by RRC for at least one pool of resources in case that at least a logical channel configured with sl-HARQ-FeedbackEnabled is set to enabled.

1> if the MAC entity has selected to create a selected sidelink grant corresponding to transmissions of multiple MAC PDUs, and SL data is available in a logical channel:
2> if the MAC entity has not selected a pool of resources allowed for the logical channel:
3> if sl-HARQ-FeedbackEnabled is set to enabled for the logical channel:
4> select any pool of resources configured with PSFCH resources among the pools of resources;
3> else:
4> select any pool of resources among the pools of resources;
2> perform the TX resource (re-)selection check on the selected pool of resources;

The MAC entity continuously performs the TX resource (re-)selection check until the corresponding pool of resources is released by RRC or the MAC entity decides to cancel creating a configured sidelink grant corresponding to transmissions of multiple MAC PDUs.

2> if the TX resource (re-)selection is triggered as the result of the TX resource (re-)selection check:
3> select one of the allowed values configured by RRC in sl-ResourceReservePeriodList and set the resource reservation interval, $P_{rsvp\_TX}$, with the selected value;
3> randomly select, with equal probability, an integer value in the interval [5, 15] for the resource reservation interval higher than or equal to 100 ms for the resource reservation interval lower than 100 ms and set SL_RESOURCE_RESELECTION_COUNTER to the selected value;
3> select the number of HARQ retransmissions from the allowed numbers that are configured by RRC in sl-MaxTxTransNumPSSCH included in sl-PSSCH-TxConfigList and, if configured by RRC, overlapped in sl-MaxTxTransNumPSSCH indicated in sl-CBR-PSSCH-TxConfigList for the highest priority of the logical channel(s) allowed on the carrier and the CBR measured by lower layers if CBR measurement results are available or the corresponding sl-defaultTxConfigIndex configured by RRC if CBR measurement results are not available;
3> select an amount of frequency resources within the range that is configured by RRC between sl-MinSubChannelNumPSSCH and sl-MaxSubchannelNumPSSCH included in sl-PSSCH-TxConfigList and, if configured by RRC, overlapped between MinSubChannelNumPSSCH and MaxSubchannelNumPSSCH indicated in sl-CBR-PSSCH-TxConfigList for the highest priority of the logical channel(s) allowed on the carrier and the CBR measured by lower layers according to if CBR measurement results are available or the corresponding sl-defaultTxConfigIndex configured by RRC if CBR measurement results are not available;

3> randomly select the time and frequency resources for one transmission opportunity from the resources indicated by the physical layer, according to the amount of selected frequency resources and the remaining PDB of SL data available in the logical channel(s) allowed on the carrier.

3> use the randomly selected resource to select a set of periodic resources spaced by the resource reservation interval for transmissions of PSCCH and PSSCH corresponding to the number of transmission opportunities of MAC PDUs;

3> if one or more HARQ retransmissions are selected:

4> if there are available resources left in the resources indicated by the physical layer for more transmission opportunities:

5> randomly select the time and frequency resources for one or more transmission opportunities from the available resources, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI;

5> if retransmission resource(s) cannot be selected up to the selected number of HARQ retransmissions by ensuring that the resource(s) can be indicated by the time resource assignment of a prior SCI:

6> randomly select the time and frequency resources for one or more transmission opportunities from the available resources, according to the amount of selected frequency resources, the selected number of HARQ retransmissions and the remaining PDB of SL data available in the logical channel(s) allowed on the carrier.

5> use the randomly selected resource to select a set of periodic resources spaced by the resource reservation interval for transmissions of PSCCH and PSSCH corresponding to the number of retransmission opportunities of the MAC PDUs;

5> consider the first set of transmission opportunities as the initial transmission opportunities and the other set(s) of transmission opportunities as the retransmission opportunities;

5> consider the sets of initial transmission opportunities and retransmission opportunities as the selected sidelink grant.

3> else:

4> consider the set as the selected sidelink grant.

3> use the selected sidelink grant to determine the set of PSCCH durations and the set of PSSCH durations.

2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by RRC in sl-ProbResourceKeep:

3> clear the selected sidelink grant, if available;

3> randomly select, with equal probability, an integer value in the interval [5, 15] for the resource reservation interval higher than or equal to 100 ms for the resource reservation interval lower than 100 ms and set SL_RESOURCE_RESELECTION_COUNTER to the selected value;

3> reuse the previously selected sidelink grant for the number of transmissions of the MAC PDUs with the resource reservation interval to determine the set of PSCCH durations and the set of PSSCH durations.

1> if the MAC entity has selected to create a selected sidelink grant corresponding to transmission(s) of a single MAC PDU, and if SL data is available in a logical channel, or a SL-CSI reporting is triggered:

2> if SL data is available in the logical channel:

3> if sl-HARQ-FeedbackEnabled is set to enabled for the logical channel:

4> select any pool of resources configured with PSFCH resources among the pools of resources;

3> else:

4> select any pool of resources among the pools of resources;

2> else if a SL-CSI reporting is triggered:

3> select any pool of resources among the pools of resources.

2> perform the TX resource (re-)selection check on the selected pool of resources;

2> if the TX resource (re-)selection is triggered as the result of the TX resource (re-)selection check:

3> select the number of HARQ retransmissions from the allowed numbers that are configured by RRC in sl-MaxTxTransNumPSSCH included in sl-PSSCH-TxConfigList and, if configured by RRC, overlapped in sl-MaxTxTransNumPSSCH indicated in sl-CBR-PSSCH-TxConfigList for the highest priority of the logical channel(s) allowed on the carrier and the CBR measured by lower layers if CBR measurement results are available or the corresponding sl-defaultTxConfigIndex configured by RRC if CBR measurement results are not available;

3> select an amount of frequency resources within the range that is configured by RRC between sl-MinSubChannelNumPSSCH and sl-MaxSubChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PSSCH-TxConfigList for the highest priority of the logical channel(s) allowed on the carrier and the CBR measured by lower layers if CBR measurement results are available or the corresponding sl-defaultTxConfigIndex configured by RRC if CBR measurement results are not available;

3> randomly select the time and frequency resources for one transmission opportunity from the resources indicated by the physical layer, according to the amount of selected frequency resources and the remaining PDB of SL data available in the logical channel(s) allowed on the carrier;

3> if one or more HARQ retransmissions are selected:

4> if there are available resources left in the resources indicated by the physical layer for more transmission opportunities:

5> randomly select the time and frequency resources for one or more transmission opportunities from the available resources, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources, and that a retransmission resource can be indicated by the time resource assignment of a prior SCI;

5> if retransmission resource(s) cannot be selected up to the selected number of HARQ retransmissions by ensuring that the resource(s) can be indicated by the time resource assignment of a prior SCI:

6> randomly select the time and frequency resources for one or more transmission opportunities from the available resources, according to the amount of selected frequency resources, the selected number of HARQ retransmissions and the remaining PDB of SL data available in the logical channel(s) allowed on the carrier.

5> consider a transmission opportunity which comes first in time as the initial transmission opportunity and other transmission opportunities as the retransmission opportunities;

5> consider all the transmission opportunities as the selected sidelink grant;

3> else:

4> consider the set as the selected sidelink grant;

3> use the selected sidelink grant to determine PSCCH duration(s) and PSSCH duration(s)

1> if a selected sidelink grant is available for retransmission(s) of a MAC PDU which has been positively acknowledged:

2> clear the PSCCH duration(s) and PSSCH duration(s) corresponding to retransmission(s) of the MAC PDU from the selected sidelink grant.

How the MAC entity determines the remaining PDB of SL data is left to UE implementation.

For a selected sidelink grant, the minimum time gap between any two selected resources comprises:

a time gap between the end of the last symbol of a PSSCH transmission of the first resource and the start of the first symbol of the corresponding PSFCH reception determined by sl-MinTimeGapPSFCH and sl-PSFCH-Period for the pool of resources; and a time required for PSFCH reception and processing plus sidelink retransmission preparation including multiplexing of necessary physical channels and any TX-RX/RX-TX switching time.

How to determine the time required for PSFCH reception and processing plus sidelink retransmission preparation is left to UE implementation.

The MAC entity shall for each PSSCH duration:

1> for each sidelink grant occurring in this PSSCH duration:

2> if the MAC entity has been configured with Sidelink resource allocation mode 1:

3> select a MCS which is, if configured, within the range that is configured by RRC between sl-MinMCS-PSSCH and sl-MaxMCS-PSSCH included in sl-ConfigDedicatedNR;

3> set the resource reservation interval to 0ms.

2> else:

3> select a MCS which is, if configured, within the range that is configured by RRC between sl-MinMCS-PSSCH and sl-MaxMCS-PSSCH included in sl-PSSCH-TxConfigList and, if configured by RRC, overlapped between sl-MinMCS-PSSCH and sl-MaxMCS-PSSCH indicated in sl-CBR-PSSCH-TxConfigList for the highest priority of the sidelink logical channel(s) in the MAC PDU and the CBR measured by lower layers if CBR measurement results are available or the corresponding sl-defaultTxConfigIndex configured by RRC if CBR measurement results are not available;

3> if the MAC entity decides not to use the selected sidelink grant for the next PSSCH duration:

4> set the resource reservation interval to 0ms.

3> else:

4> set the resource reservation interval to the selected value.

MCS selection is up to UE implementation if the MCS or the corresponding range is not configured by RRC.

2> if the configured sidelink grant has been activated and this PSSCH duration corresponds to the first PSSCH transmission opportunity within this sl-PeriodCG of the configured sidelink grant:

3> set the HARQ Process ID to the HARQ Process ID associated with this PSSCH duration and, if available, all subsequent PSSCH duration(s) occurring in this sl-PeriodCG for the configured sidelink grant;

3> determine that this PSSCH duration is used for initial transmission;

3> if a dynamic sidelink grant associated to the HARQ Process ID has been received on the PDCCH for the MAC entity's SLCS-RNTI:

4> clear the dynamic sidelink grant.

2> deliver the sidelink grant, the selected MCS, and the associated HARQ information to the Sidelink HARQ Entity for this PSSCH duration.

For configured sidelink grants, the HARQ Process ID associated with the first slot of a SL transmission is derived from the following equation:

HARQ Process ID=[floor(CURRENT_slot/sl-PeriodCG)] modulo sl-NrOfHARQ-Processes+sl-HARQ-ProcID-offset where CURRENT_slot=(SFN×numberOfSlotsPerFrame+slot number in the frame), and numberOfSlotsPerFrame refer to the number of consecutive slots per frame.

According to some embodiments of the present disclosure, a UE may perform TX resource (re-)selection check.

If the TX resource (re-)selection check procedure is triggered for a Sidelink process, the MAC entity shall for the Sidelink process:

1> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or 1> if neither transmission nor retransmission has been performed by the MAC entity on any resource indicated in the configured sidelink grant during [the last second]; or 1> if sl-ReselectAfter is configured and the number of consecutive unused transmission opportunities on resources indicated in the configured sidelink grant is equal to sl-ReselectAfter; or 1> if there is no configured sidelink grant; or 1> if the configured sidelink grant cannot accommodate a RLC SDU [by using the maximum allowed MCS configured by upper layers in maxMCS-PSSCH] and the MAC entity selects not to segment the RLC SDU; or If the configured sidelink grant cannot accommodate the RLC SDU, it is left for UE implementation whether to perform segmentation or sidelink resource reselection.

1> if transmission(s) with the configured sidelink grant cannot fulfil the latency requirement of the data in a logical channel according to the associated priority, and the MAC entity selects not to perform transmission(s) corresponding to a single MAC PDU; or If the latency requirement is not met, it is left for UE implementation whether to perform transmission(s) corresponding to single MAC PDU or sidelink resource reselection.

1> if a pool of resources is configured or reconfigured by upper layers; or]

1> if sidelink transmission is scheduled by the other UE with a higher priority than the priority of the logical channel and expected to overlap with a resource of the configured sidelink grant, and a measured result on SL-RSRP associated with the sidelink transmission is higher than [threshold]; or 1> if the logical channel is mapped to any configured sidelink grant; or 1> if HARQ feedback is enabled for the logical channel, and the configured sidelink grant cannot support HARQ feedback (e.g. no HARQ feedback resource has been reserved for the configured sidelink grant); or 1> if HARQ feedback is disabled for the logical channel, and the configured sidelink grant supports HARQ feedback (e.g. HARQ feedback resources have been reserved for the configured sidelink grant); or 1> if a SCCH or a MAC Control Element carrying sidelink CSI reporting is (re-)configured, a sidelink CSI reporting is triggered for a PC5-RRC connection or a destination, and the CSI reporting is not mapped to any configured sidelink grant or cannot be accommodated by any configured sidelink grant; or 1> if a SCCH or a MAC Control Element carrying sidelink CSI reporting is released for a PC5-RRC connection or a destination; or 1> if a sidelink SL-RSRP measurement reporting is (re-)configured for a PC5-RRC connection or a destination, a sidelink SL-RSRP reporting is triggered either periodically or by an event such as A1 or A3, and the sidelink measurement reporting is not mapped to any configured sidelink grant or cannot be accommodated by any configured sidelink grant; or 1> if a sidelink SL-RSRP measurement reporting is released for a PC5-RRC connection or a destination; or 1> if establishment of a PC5-S unicast link and/or a PC5-RRC connection which configures the logical channel is triggered by upper layers, or if release of a PC5-S unicast link and/or a PC5-RRC connection which releases the logical channel is triggered by upper layers or completed, or if radio link failure is detected or declared and the logical channel is released as a result of the failure; or 2> clear the configured sidelink grant associated to the Sidelink process, if available;

2> trigger the TX resource (re-)selection.

According to some embodiments of the present disclosure, a UE may perform TX resource (re-)selection check.

TX resource (re-)selection check

If the TX resource (re-)selection check procedure is triggered on the selected pool of resources for a Sidelink process, the MAC entity shall for the Sidelink process:

1> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by RRC in sl-ProbResourceKeep; or 1> if the pool of resources is configured or reconfigured by RRC; or 1> if there is no selected sidelink grant on the selected pool of resources; or 1> if neither transmission nor retransmission has been performed by the MAC entity on any resource indicated in the selected sidelink grant during the last second; or 1> if sl-ReselectAfter is configured and the number of consecutive unused transmission opportunities on resources indicated in the selected sidelink grant is equal to sl-ReselectAfter; or 1> if the selected sidelink grant cannot accommodate a RLC SDU by using the maximum allowed MCS configured by RRC in sl-MaxMCS-PSSCH and the UE selects not to segment the RLC SDU; or If the selected sidelink grant cannot accommodate the RLC SDU, it is left for UE implementation whether to perform segmentation or sidelink resource reselection.

1> if transmission(s) with the selected sidelink grant cannot fulfil the latency requirement of the data in a logical channel according to the associated priority, and the MAC entity selects not to perform transmission(s) corresponding to a single MAC PDU:

If the latency requirement is not met, it is left for UE implementation whether to perform transmission(s) corresponding to single MAC PDU or sidelink resource reselection.

It is left for UE implementation whether to trigger the TX resource (re-)selection due to the latency requirement of the MAC CE triggered.

2> clear the selected sidelink grant associated to the Sidelink process, if available;

2> trigger the TX resource (re-)selection.

1> if a resource(s) of the selected sidelink grant is indicated for re-evaluation or pre-emption by the physical layer; or 1> if retransmission of a MAC PDU on the selected sidelink grant has been dropped by either sidelink congestion control or de-prioritization:

2> remove the resource(s) from the selected sidelink grant associated to the Sidelink process, if the resource(s) of the selected sidelink grant is indicated for re-evaluation or pre-emption by the physical layer;

1> randomly select the time and frequency resource from the resources indicated by the physical layer for either the removed resource or the dropped resource, according to the amount of selected frequency resources, the selected number of HARQ retransmissions and the remaining PDB of either SL data available in the logical channel(s) by ensuring the minimum time gap between any two selected resources of the selected sidelink grant in case that PSFCH is configured for this pool of resources, and that a resource can be indicated by the time resource assignment of a SCI for a retransmission;

1> if no resource(s) is selected by ensuring that the resource(s) can be indicated by the time resource assignment of a SCI for one or more retransmissions:

3> randomly select the time and frequency resources for one or more transmission opportunities from the available resources, according to the amount of selected frequency resources, the selected number of HARQ retransmissions and the remaining PDB of SL data available in the logical channel(s) allowed on the carrier.

2> replace the removed or dropped resource(s) by the selected resource(s) for the selected sidelink grant.

According to some embodiments of the present disclosure, a UE may perform SL CSI reporting procedure.

The Sidelink Channel Status Information (SL CSI) reporting procedure is used to provide a peer UE with sidelink channel status such as CQI and RI based on measurement on SL CSI-RS transmission(s) provided by the peer UE.

RRC configures the following parameters to control the SL CSI reporting for each pair of the Source Layer-2 ID and the Destination Layer-2 ID:

periodicCSI-TimerSL;

retxCSI-TimerSL;

CSIreporting-DelayTimerAppliedSL;

CSIreporting-DelayTimerSL;

CSIreporting-MaskSL.

The MAC entity shall for the pair of the Source Layer-2 ID and the Destination Layer-2 ID:
1> for each SCI in which the MAC entity is interested:
2> if the SCI indicates SL CSI reporting:
3> triggers SL CSI reporting for the pair;
3> consider the priority of the SL CSI Reporting MAC CE as either the highest priority of the logical channels belonging to the pair or the priority value indicated by this SCI or by the peer UE via a PC5-RRC signaling.

The priority of the SL CSI Reporting MAC CE is used for logical channel prioritization, transmission of SCI information indicating the presence and priority of the SL CSI Reporting MAC CE, and prioritization of SL transmission carrying the SL CSI Reporting MAC CE over any UL transmission in collision.
1> if UL resources are allocated and the number of padding bits remaining is equal to or larger than the size of the SL CSI Reporting MAC CE plus its subheader, or
1> if retxCSI-TimerSL expires for the pair; or
1> if periodicCSI-TimerSL expires for the pair:
2> triggers SL CSI reporting for the pair.
1> if the SL CSI reporting is triggered for the pair for which CSIreporting-DelayTimerAppliedSL with value true is configured by upper layers; or
2> start or restart the CSIreporting-DelayTimerSL.
1> else:
2> if running, stop the CSIreporting-DelayTimerSL.

For SL CSI reporting triggered by retxCSI-TimerSL expiry, the MAC entity considers the highest priority of the logical channels belonging to the pair as the priority of the SL CSI reporting.

The MAC entity shall for the pair of the Source Layer-2 ID and the Destination Layer-2 ID:
1> if the SL CSI reporting procedure determines that at least one SL CSI reporting has been triggered and not cancelled:
2> if SL-SCH resources are available for a new transmission and the SL-SCH resources can accommodate the SL CSI Reporting MAC CE plus its subheader as a result of logical channel prioritization; or
2> if UL resources are allocated and the number of padding bits remaining is equal to or larger than the size of the SL CSI Reporting MAC CE plus its subheader:
3> instruct the Multiplexing and Assembly procedure to generate the SL CSI Reporting MAC CE in which CSI information is included based on up to the latest measured result on SL CSI-RI transmission provided by the peer UE for the pair;
3> consider the priority of the SL CSI Reporting MAC CE as either the highest priority of the logical channels belonging to the Destination or the priority value indicated by this SCI or by the peer UE via a PC5-RRC signaling for logical channel prioritization, for transmission of SCI information indicating the presence and priority of the SL CSI Reporting MAC CE, and for prioritization of SL transmission carrying the SL CSI Reporting MAC CE over any UL transmission in collision.
3> start or restart periodicCSI-TimerSL;
3> start or restart retxCSI-TimerSL;
3> cancel all SL CSI reporting triggered for the pair.
2> if a SL CSI reporting has been triggered and CSIreporting-DelayTimerSL is not running:
3> if there is no SL-SCH resource available for a new transmission; or 3> if a configured sidelink grant is available for the SL CSI reporting and the SL CSI reporting was triggered for the pair for which CSIreporting-MaskSL is set to false:
4> trigger the TX resource (re-)selection.

According to some embodiments of the present disclosure, a UE may perform CSI reporting.

The Sidelink Channel State Information (SL-CSI) reporting procedure is used to provide a peer UE with sidelink channel state information.

RRC configures the following parameters to control the SL-CSI reporting procedure:
sl-LatencyBound-CSI-Report, which is maintained for each PC5-RRC connection.

The MAC entity maintains a sl-CSI-ReportTimer for each pair of the Source Layer-2 ID and the Destination Layer-2 ID corresponding to a PC5-RRC connection. sl-CSI-ReportTimer is used for a SL-CSI reporting UE to follow the latency requirement signalled from a CSI triggering UE. The value of sl-CSI-ReportTimer is the same as the latency requirement of the SL-CSI reporting in sl-LatencyBound-CSI-Report configured by RRC.

The MAC entity shall for each pair of the Source Layer-2 ID and the Destination Layer-2 ID corresponding to a PC5-RRC connection which has been established by upper layers:
1> if the SL-CSI reporting has been triggered by a SCI and not cancelled:
2> if the sl-CSI-ReportTimer for the triggered SL-CSI reporting is not running:
3> start the sl-CSI-ReportTimer.
2> if the sl-CSI-ReportTimer for the triggered SL-CSI reporting expires:
3> cancel the triggered SL-CSI reporting.
2> else if the MAC entity has SL resources allocated for new transmission and the SL-SCH resources can accommodate the SL CSI reporting MAC CE and its subheader as a result of logical channel prioritization:
3> instruct the Multiplexing and Assembly procedure to generate a Sidelink CSI Reporting MAC CE;
3> stop the sl-CSI-ReportTimer for the triggered SL-CSI reporting;
3> cancel the triggered SL-CSI reporting.
2> else if the MAC entity has been configured with Sidelink resource allocation mode 1:
3> trigger a Scheduling Request.

The MAC entity configured with Sidelink resource allocation mode 1 may trigger a Scheduling Request if transmission of a pending SL-CSI reporting with the sidelink grant(s) cannot fulfil the latency requirement associated to the SL-CSI reporting.

According to some embodiments of the present disclosure, a Sidelink CSI Reporting MAC CE generated by a wireless device may include 8 bits of 1 Octet.

The Sidelink CSI Reporting MAC CE is identified by a MAC subheader with LCID. The priority of the Sidelink CSI Reporting MAC CE is fixed to '1'. The Sidelink CSI Reporting MAC CE is defined as follows:
RI: This field indicates the derived value of the Rank Indicator for sidelink CSI reporting. The length of the field is 1 bit;
CQI: This field indicates the derived value of the Channel Quality Indicator for sidelink CSI reporting. The length of the field is 4 bit;
R: Reserved bit, set to 0.

For example, a Sidelink CSI Reporting MAC CE may include 1 bit of RI, 5 bit of CQI, and 3 bit of R.

Hereinafter, an apparatus for selecting a sidelink resource for a sidelink CSI reporting in a wireless communication system, according to some embodiments of the present disclosure, will be described. Herein, the apparatus may be a wireless device (100 or 200) in FIG. 7, 8, 9 or 10.

For example, a first wireless device may perform methods described above. The detailed description overlapping with the above-described contents could be simplified or omitted.

Referring to FIG. 7, a first wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to establish a PC5-Radio Resource Control (RRC) connection with a second wireless device. The processor 102 may be configured to control the transceiver 106 receive a request for a sidelink (SL) Channel State Information (CSI) reporting from the second wireless device. The processor 102 may be configured to trigger the SL CSI reporting for the PC5-RRC connection. The processor 102 may be configured to determine to create a sidelink grant corresponding to transmission of a single MAC PDU based on the triggered SL CSI reporting or a SL data available for transmission. The processor 102 may be configured to trigger a resource selection procedure based on the determination. The processor 102 may be configured to select a sidelink resource in the resource selection procedure. The processor 102 may be configured to create a MAC PDU based on the triggered SL SCI reporting for the selected sidelink resource. The processor 102 may be configured to control the transceiver 106 to transmit the created MAC PDU based on the selected sidelink resource.

According to some embodiments of the present disclosure, in the resource selection procedure, the processor 102 may be configured to select a pool of resources in a carrier. The processor 102 may be configured to perform a resource selection check procedure on the selected pool of resources.

According to some embodiments of the present disclosure, in the resource selection check procedure further comprises, the processor 102 may be configured to select the sidelink resource in the pool of resources. The processor 102 may be configured to allocate the selected sidelink resource for a sidelink grant.

For example, in the resource selection check procedure, the processor 102 may be configured to reselect a sidelink resource based on that the sidelink grant does not fulfil a latency requirement of a data in a logical channel.

For example, the processor 102 may be configured to use the sidelink grant to determine Physical Sidelink Control Channel (PSCCH) duration and Physical Sidelink Shared Channel (PSSCH) duration.

For example, the processor 102 may be configured to control the transceiver 106 to transmit the created MAC PDU based on the determined PSCCH duration and the determined PSSCH duration.

According to some embodiments of the present disclosure, the SL CSI reporting may be triggered for a pair of a Source ID for the first wireless device and a Destination ID for the second wireless device corresponding to the PC5-RRC connection.

According to some embodiments of the present disclosure, based on that the SL data in a logical channel is available for transmission, the processor 102 may be configured to determine whether the Hybrid Automatic Repeat Request (HARQ) feedback is enabled for the logical channel or not.

For example, based on that the HARQ feedback is enabled for the logical channel, the processor 102 may be configured to select the sidelink resource among a pool of resources configured with Physical Sidelink Feedback Channel (PSFCH) resources.

According to some embodiments of the present disclosure, the processor 102 may be configured to configure sidelink resource allocation mode 2 for transmission using at least one of pools of resources in a carrier.

According to some embodiments of the present disclosure, the request for the SL CSI reporting may include a Sidelink Control Information transmitted via a Physical Sidelink Control Channel (PSCCH) and/or a Physical Sidelink Shared Channel (PSSCH).

According to some embodiments of the present disclosure, the generated MAC CE may include a Channel Quality Indicator (CQI) for the first PC5-RRC connection.

According to some embodiments of the present disclosure, the processor 102 may be configured to be in communication with at least one of a user equipment, a network, or an autonomous vehicle other than the first wireless device.

Hereinafter, a processor for a first wireless device for selecting a sidelink resource for a sidelink CSI reporting in a wireless communication system, according to some embodiments of the present disclosure, will be described.

The processor is configured to control the first wireless device to establish a PC5-Radio Resource Control (RRC) connection with a second wireless device. The processor is configured to control the first wireless device to receive a request for a sidelink (SL) Channel State Information (CSI) reporting from the second wireless device. The processor is configured to control the first wireless device to trigger the SL CSI reporting for the PC5-RRC connection. The processor is configured to control the first wireless device to determine to create a sidelink grant corresponding to transmission of a single MAC PDU based on the triggered SL CSI reporting or a SL data available for transmission. The processor is configured to control the first wireless device to trigger a resource selection procedure based on the determination. The processor is configured to control the first wireless device to select a sidelink resource in the resource selection procedure. The processor is configured to control the first wireless device to create a MAC PDU based on the triggered SL SCI reporting for the selected sidelink resource. The processor is configured to control the first wireless device to transmit the created MAC PDU based on the selected sidelink resource.

According to some embodiments of the present disclosure, in the resource selection procedure, the processor is configured to control the first wireless device to select a pool of resources in a carrier. The processor is configured to control the first wireless device to perform a resource selection check procedure on the selected pool of resources.

According to some embodiments of the present disclosure, in the resource selection check procedure further comprises, the processor is configured to control the first wireless device to select the sidelink resource in the pool of resources. The processor is configured to control the first wireless device to allocate the selected sidelink resource for a sidelink grant.

For example, in the resource selection check procedure, the processor is configured to control the first wireless device to reselect a sidelink resource based on that the sidelink grant does not fulfil a latency requirement of a data in a logical channel.

For example, the processor is configured to control the first wireless device to use the sidelink grant to determine Physical Sidelink Control Channel (PSCCH) duration and Physical Sidelink Shared Channel (PSSCH) duration.

For example, the processor is configured to control the first wireless device to transmit the created MAC PDU based on the determined PSCCH duration and the determined PSSCH duration.

According to some embodiments of the present disclosure, the SL CSI reporting may be triggered for a pair of a Source ID for the first wireless device and a Destination ID for the second wireless device corresponding to the PC5-RRC connection.

According to some embodiments of the present disclosure, based on that the SL data in a logical channel is available for transmission, the processor is configured to control the first wireless device to determine whether the Hybrid Automatic Repeat Request (HARQ) feedback is enabled for the logical channel or not.

For example, based on that the HARQ feedback is enabled for the logical channel, the processor is configured to control the first wireless device to select the sidelink resource among a pool of resources configured with Physical Sidelink Feedback Channel (PSFCH) resources.

According to some embodiments of the present disclosure, the processor is configured to control the first wireless device to configure sidelink resource allocation mode 2 for transmission using at least one of pools of resources in a carrier.

According to some embodiments of the present disclosure, the request for the SL CSI reporting may include a Sidelink Control Information transmitted via a Physical Sidelink Control Channel (PSCCH) and/or a Physical Sidelink Shared Channel (PSSCH).

According to some embodiments of the present disclosure, the generated MAC CE may include a Channel Quality Indicator (CQI) for the first PC5-RRC connection.

According to some embodiments of the present disclosure, the processor may be configured to control the first wireless device to be in communication with at least one of a user equipment, a network, or an autonomous vehicle other than the first wireless device.

Hereinafter, a non-transitory computer-readable medium has stored thereon a plurality of instructions for selecting a sidelink resource for a sidelink CSI reporting in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a first wireless device.

The stored a plurality of instructions may cause the first wireless device to establish a PC5-Radio Resource Control (RRC) connection with a second wireless device. The stored a plurality of instructions may cause the first wireless device to receive a request for a sidelink (SL) Channel State Information (CSI) reporting from the second wireless device. The stored a plurality of instructions may cause the first wireless device to trigger the SL CSI reporting for the PC5-RRC connection. The stored a plurality of instructions may cause the first wireless device to determine to create a sidelink grant corresponding to transmission of a single MAC PDU based on the triggered SL CSI reporting or a SL data available for transmission. The stored a plurality of instructions may cause the first wireless device to trigger a resource selection procedure based on the determination. The stored a plurality of instructions may cause the first wireless device to select a sidelink resource in the resource selection procedure. The stored a plurality of instructions may cause the first wireless device to create a MAC PDU based on the triggered SL SCI reporting for the selected sidelink resource. The stored a plurality of instructions may cause the first wireless device to transmit the created MAC PDU based on the selected sidelink resource.

According to some embodiments of the present disclosure, in the resource selection procedure, the stored a plurality of instructions may cause the first wireless device to select a pool of resources in a carrier. The stored a plurality of instructions may cause the first wireless device to perform a resource selection check procedure on the selected pool of resources.

According to some embodiments of the present disclosure, in the resource selection check procedure further comprises, the stored a plurality of instructions may cause the first wireless device to select the sidelink resource in the pool of resources. The stored a plurality of instructions may cause the first wireless device to allocate the selected sidelink resource for a sidelink grant.

For example, in the resource selection check procedure, the stored a plurality of instructions may cause the first wireless device to reselect a sidelink resource based on that the sidelink grant does not fulfil a latency requirement of a data in a logical channel.

For example, the stored a plurality of instructions may cause the first wireless device to use the sidelink grant to determine Physical Sidelink Control Channel (PSCCH) duration and Physical Sidelink Shared Channel (PSSCH) duration.

For example, the stored a plurality of instructions may cause the first wireless device to transmit the created MAC PDU based on the determined PSCCH duration and the determined PSSCH duration.

According to some embodiments of the present disclosure, the SL CSI reporting may be triggered for a pair of a Source ID for the first wireless device and a Destination ID for the second wireless device corresponding to the PC5-RRC connection.

According to some embodiments of the present disclosure, based on that the SL data in a logical channel is available for transmission, the stored a plurality of instructions may cause the first wireless device to determine whether the Hybrid Automatic Repeat Request (HARQ) feedback is enabled for the logical channel or not.

For example, based on that the HARQ feedback is enabled for the logical channel, the stored a plurality of instructions may cause the first wireless device to select the sidelink resource among a pool of resources configured with Physical Sidelink Feedback Channel (PSFCH) resources.

According to some embodiments of the present disclosure, the stored a plurality of instructions may cause the first wireless device to configure sidelink resource allocation mode 2 for transmission using at least one of pools of resources in a carrier.

According to some embodiments of the present disclosure, the request for the SL CSI reporting may include a Sidelink Control Information transmitted via a Physical Sidelink Control Channel (PSCCH) and/or a Physical Sidelink Shared Channel (PSSCH).

According to some embodiments of the present disclosure, the generated MAC CE may include a Channel Quality Indicator (CQI) for the first PC5-RRC connection.

According to some embodiments of the present disclosure, the stored a plurality of instructions may cause the first wireless device to be in communication with at least one of a user equipment, a network, or an autonomous vehicle other than the first wireless device.

Hereinafter, a method for selecting a sidelink resource for a sidelink CSI reporting performed by a second wireless device (for example, reception UE) in a wireless communication system, according to some embodiments of the present disclosure, will be described.

The second wireless device may establish a PC5-Radio Resource Control (RRC) connection with a first wireless device.

The second wireless device may transmit, to a first wireless device, a request for a sidelink (SL) Channel State Information (CSI) reporting.

The second wireless device may receive, from the first wireless device, a MAC CE for the SL CSI reporting.

Hereinafter, a second wireless device (for example, reception UE) selecting a sidelink resource for a sidelink CSI in a wireless communication system, according to some embodiments of the present disclosure, will be described.

The second wireless device may include a transceiver, a memory, and a processor operatively coupled to the transceiver and the memory.

The processor may be configured to establish a PC5-Radio Resource Control (RRC) connection with a first wireless device.

The processor may be configured to control the transceiver to transmit, to a first wireless device, a request for a sidelink (SL) Channel State Information (CSI) reporting.

The processor may be configured to control the transceiver to receive, from the first wireless device, a MAC CE for the SL CSI reporting.

The present disclosure can have various advantageous effects.

According to some embodiments of the present disclosure, a wireless device could select a sidelink resource for a sidelink reporting in a wireless communication system efficiently.

For example, a wireless device could perform the CSI reporting properly by allocating sidelink resources efficiently.

For example, a wireless communication system could properly provide resource management by selecting a sidelink resource for a sidelink reporting in a wireless communication system.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Figure 15:
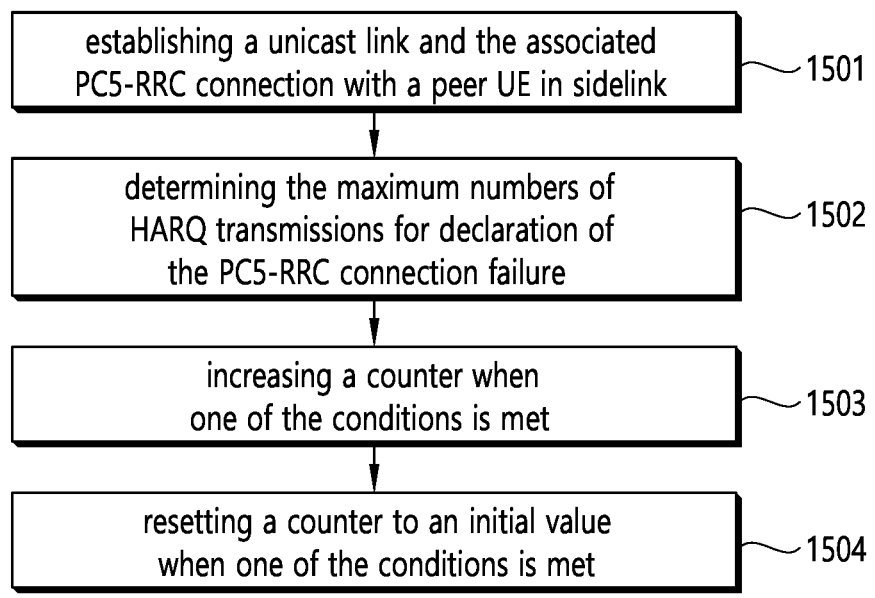
FIG. 15 shows an example of a method for performing data transmission by a UE to which the technical features of the present disclosure can be applied.

FIG. 15 shows an example of a method for performing data transmission by a UE to which the technical features of the present disclosure can be applied.

In step 1501, UE may establish a unicast link and the associated PC5-RRC connection with a peer UE in sidelink.

In step 1502, UE may determine the maximum numbers of HARQ transmissions for declaration of the PC5-RRC connection failure.

For example, the maximum numbers of HARQ transmissions for declaration of the PC5-RRC connection failure may be configured by the network or the peer UE.

For other example, UE may determine the maximum numbers of HARQ transmissions for declaration of the PC5-RRC connection failure based on the QoS parameters of logical channels belonging to the PC5-RRC connection or the unicast link.

In step 1503, UE may increase a counter when one of the following conditions is met:
- if no acknowledgement to a transmission of any MAC PDU (e.g. HARQ feedback) has been received; and/or
- if a negative acknowledgement to a transmission of any MAC PDU has been received.

In step 1504, UE may reset a counter to an initial value (e.g. zero) when one of the following conditions is met:
- if a parameter related to establishment of a PC5-RRC connection or PC5-S unicast link is indicated by upper layers; and/or
- if a very first new transmission is triggered by this sidelink HARQ entity for the PC5-RRC connection; and/or
- if N acknowledgements (for example, HARQ feedbacks) have been received either consecutively or within an interval.

Figure 16:
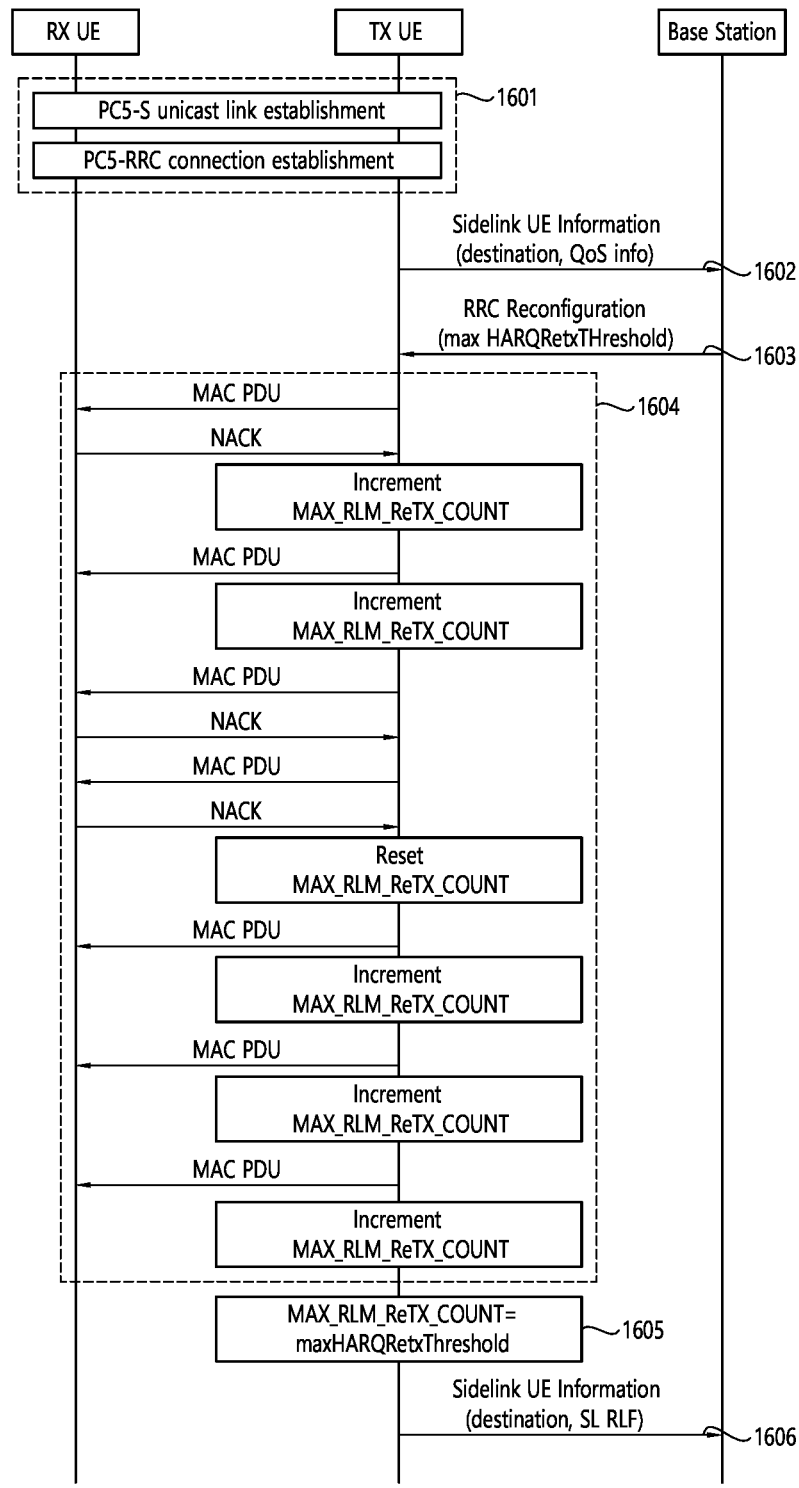
FIG. 16 shows an example of method for sidelink HARQ transmissions and failure detection from a UE in a wireless communication system, according to some embodiments of the present disclosure.

FIG. 16 shows an example of method for sidelink HARQ transmissions and failure detection from a UE in a wireless communication system, according to some embodiments of the present disclosure.

In particular FIG. 16 shows an example of sidelink HARQ transmissions and failure detection from a UE to which the technical features of the present disclosure can be applied.

It is clear that present disclosure is not limited thereto. The present disclosure could be applied to quality reporting for uplink data transmission as well.

In step 1601, TX UE may establish a PC5-S unicast link and the associated PC5-RRC connection with RX UE.

In step 1602, TX UE may send Sidelink UE information indicating the destination ID of the RX UE to the network. TX UE may indicate the destination ID and the associated QoS information to the network via the Sidelink UE Information. The destination ID may be associated to a destination index according to the contents of the Sidelink UE Information.

In step 1603, upon receiving the Sidelink UE information, the network may send RRC Reconfiguration message to the TX UE. The message may include N value and maxHARQRetxThreshold with the destination index.

In TX UE, the Sidelink HARQ Entity may maintain an N value, maxHARQRetxThreshold and MAX_RLM_ReTX_COUNT for each PC5-RRC connection that has established by RRC (or for each PC5-S unicast link established by PC5-S entity, each destination or each pair of a Source Layer-2 ID and a Destination Layer-2 ID).

The N value and maxHARQRetxThreshold may be configured by RRC for the PC5-RRC connection (or the PC5-S unicast link established by PC5-S entity, the destination or the pair of a Source Layer-2 ID and a Destination Layer-2 ID).

The Sidelink HARQ Entity may correspond both receiving and transmitting Sidelink HARQ Entity or either receiving or transmitting Sidelink HARQ Entity.

The maxHARQRetxThreshold may be configured with the value of the maxHARQRetxThreshold configured for the logical channel with the highest priority belonging to the PC5-RRC connection or with the lowest, an average or highest value of all maxHARQRetxThreshold values configured for all logical channels belonging to the PC5-RRC connection (or the PC5-S unicast link established by PC5-S entity, the destination or the pair of a Source Layer-2 ID and a Destination Layer-2 ID).

The N value may be configured with the value of the N value configured for the logical channel with the highest priority belonging to the PC5-RRC connection or with the lowest, an average or highest value of all N values configured for all logical channels belonging to the PC5-RRC connection (or the PC5-S unicast link established by PC5-S entity, the destination or the pair of a Source Layer-2 ID and a Destination Layer-2 ID).

The Sidelink HARQ Entity in TX UE may set the MAX_RLM_ReTX_COUNT to zero for each PC5-RRC connection that has established by RRC (or for each PC5-S unicast link established by PC5-S entity, each destination or each pair of a Source Layer-2 ID and a Destination Layer-2 ID), when one of the following conditions is met:
- if maxHARQRetxThreshold is configured by RRC (for example, initial step of HARQ based RLM e.g. upon establishment of a PC5-RRC connection or PC5-S unicast link); and/or
- if a parameter related to establishment of a PC5-RRC connection or PC5-S unicast link is indicated by upper layers; and/or
- if a very first new transmission is triggered by this sidelink HARQ entity for the PC5-RRC connection (or the PC5-S unicast link established by PC5-S entity, the destination or the pair of a Source Layer-2 ID and a Destination Layer-2 ID); and/or
- if N acknowledgements have been received on PSFCH either consecutively or in an interval (Wherein N can be one or more):
  The N acknowledgements may correspond to only positive acknowledgements successfully received on PSFCH; and/or
  The N acknowledgements may correspond to only negative acknowledgements successfully received on PSFCH; and/or
  The N acknowledgements may correspond to both positive and negative acknowledgements successfully received on PSFCH; and/or
  The N acknowledgements may not include unsuccessful reception of any acknowledgement on PSFCH (for example, either no HARQ feedback transmission of an acknowledgement from a peer UE (for example, because the peer UE does not successfully receive the corresponding PSCCH and/or PSSCH) or no reception of HARQ feedback transmission from a peer UE (for example, because this UE does not successfully receive the corresponding PSFCH).

In step 1604, the Sidelink HARQ Entity in TX UE may increment the MAX_RLM_ReTX_COUNT for each PC5-RRC connection that has established by RRC (or for each PC5-S unicast link established by PC5-S entity, each destination or each pair of a Source Layer-2 ID and a Destination Layer-2 ID), when one of the following conditions is met:
- if no acknowledgement to a transmission of any MAC PDU has been received on PSFCH; and/or
  Option 1: the acknowledgement may only correspond to a positive acknowledgement successfully received on PSFCH;
  Option 2: the acknowledgement may only correspond to a negative acknowledgement successfully received on PSFCH;
  Option 3: the acknowledgement may only correspond to either a positive or a negative acknowledgement successfully received on PSFCH;
- if a negative acknowledgement to a transmission of any MAC PDU has been received on PSFCH.

In step 1605, if MAX_RLM_ReTX_COUNT reaches maxHARQRetxThreshold, the MAC entity in TX UE may indicate to RRC that max HARQ retransmission has been reached for each PC5-RRC connection that has established by RRC (or for each PC5-S unicast link established by PC5-S entity, each destination or each pair of a Source Layer-2 ID and a Destination Layer-2 ID)

In step 1606, upon receiving this indication from the MAC entity, TX UE RRC may declare sidelink radio link failure on the corresponding PC5-RRC connection (or the corresponding pair or the corresponding destination) and indicate sidelink radio link failure to the network.

According to some embodiments of the present disclosure, the UL transmissions and SL transmissions could be performed for different RATs or the same RAT.

The present disclosure could be also applied to radio link failure of different uplink transmissions to different base stations, for example, configured for dual connectivity or carrier aggregation in uplink. In this case, the TX UE in FIG. 16 can be replaced by the same or a different base station.

The present disclosure may be applied to various future technologies, such as AI.

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first wireless device in a wireless communication system, the method comprising:
   establishing a PC5-Radio Resource Control (RRC) connection with a second wireless device;
   receiving a request for a sidelink (SL) Channel State Information (CSI) reporting from the second wireless device;
   triggering the SL CSI reporting for the PC5-RRC connection;
   determining to create a sidelink grant corresponding to transmission of a single Media Access Control (MAC) Packet Data Unit (PDU) based on the triggered SL CSI reporting;
   triggering a resource selection procedure, based on that there is no sidelink grant to be used for the triggered SL CSI reporting;
   selecting a sidelink resource in the resource selection procedure;
   creating a MAC PDU based on the triggered SL SCI reporting for the selected sidelink resource; and
   transmitting the created MAC PDU based on the selected sidelink resource.

2. The method of claim 1, wherein the resource selection procedure is further comprises:
   selecting a pool of resources in a carrier; and
   performing a resource selection check procedure on the selected pool of resources.

3. The method of claim 2, wherein the resource selection check procedure further comprises:
   selecting the sidelink resource in the pool of resources; and
   allocating the selected sidelink resource for a sidelink grant.

4. The method of claim 3, wherein the resource selection check procedure further comprises:
   reselecting a sidelink resource based on that the sidelink grant does not fulfil a latency requirement of a data in a logical channel.

5. The method of claim 3, wherein the method further comprises:
   using the sidelink grant to determine Physical Sidelink Control Channel (PSCCH) duration and Physical Sidelink Shared Channel (PSSCH) duration.

6. The method of claim 5, wherein the created MAC PDU is transmitted based on the determined PSCCH duration and the determined PSSCH duration.

7. The method of claim 1, wherein the SL CSI reporting is triggered for a pair of a Source ID for the first wireless device and a Destination ID for the second wireless device corresponding to the PC5-RRC connection.

8. The method of claim 1, the method further comprises:
   configuring sidelink resource allocation mode 2 for transmission using at least one of pools of resources in a carrier.

9. The method of claim 1, wherein the request for the SL CSI reporting includes a Sidelink Control Information transmitted via a Physical Sidelink Control Channel (PSCCH) and/or a Physical Sidelink Shared Channel (PSSCH).

10. The method of claim 1, wherein the generated MAC CE includes a Channel Quality Indicator (CQI) for the rust PC5-RRC connection.

11. The method of claim 1, wherein the rust wireless device is in communication with at least one of a user equipment, a network, or an autonomous vehicle other than the rust wireless device.

12. A first wireless device in a wireless communication system comprising:
   a transceiver;
   a memory; and
   at least one processor operatively coupled to the transceiver and the memory, and configured to:
   establish a PC5-Radio Resource Control (RRC) connection with a second wireless device;
   control the transceiver to receive a request for a sidelink (SL) Channel State Information (CSI) reporting from the second wireless device;

trigger the SL CSI reporting for the PC5-RRC connection;
determine to create a sidelink grant corresponding to transmission of a single Media Access Control (MAC) Packet Data Unit (PDU) based on the triggered SL CSI reporting;
trigger a resource selection procedure, based on that there is no sidelink grant to be used for the triggered SL CSI reporting;
select a sidelink resource in the resource selection procedure;
create a MAC PDU based on the triggered SL SCI reporting for the selected sidelink resource; and
transmit the created MAC PDU based on the selected sidelink resource.

13. The first wireless device of claim 12, wherein the at least one processor is further configured to:
select a pool of resources in a carrier; and
perform a resource selection check procedure on the selected pool of resources.

14. The first wireless device of claim 13, wherein the at least one processor is further configured to:
select the sidelink resource in the pool of resources; and
allocate the selected sidelink resource for a sidelink grant.

15. The first wireless device of claim 14, wherein the at least one processor is further configured to:
reselect a sidelink resource based on that the sidelink grant does not fulfil a latency requirement of a data in a logical channel.

16. The first wireless device of claim 14, wherein the at least one processor is further configured to:
use the sidelink grant to determine Physical Sidelink Control Channel (PSCCH) duration and Physical Sidelink Shared Channel (PSSCH) duration.

17. The first wireless device of claim 16, wherein the created MAC PDU is transmitted based on the determined PSCCH duration and the determined PSSCH duration.

18. The first wireless device of claim 12, wherein the SL CSI reporting is triggered for a pair of a Source ID for the first wireless device and a Destination ID for the second wireless device corresponding to the PC5-RRC connection.

19. The first wireless device of claim 12, wherein the at least one processor is further configured to:
configuring sidelink resource allocation mode 2 for transmission using at least one of pools of resources in a carrier.

20. A non-transitory computer-readable medium having stored thereon a plurality of instructions, which, when executed by a processor of a first wireless device, cause the first wireless device to:
establish a PC5-Radio Resource Control (RRC) connection with a second wireless device;
receive a request for a sidelink (SL) Channel State Information (CSI) reporting from the second wireless device;
trigger the SL CSI reporting for the PC5-RRC connection;
determine to create a sidelink grant corresponding to transmission of a single Media Access Control (MAC) Packet Data Unit (PDU) based on the triggered SL CSI reporting;
trigger a resource selection procedure, based on that them is no sidelink grant to be used for the triggered SL CSI reporting;
select a sidelink resource in the resource selection procedure;
create a MAC PDU based on the triggered SL SCI reporting for the selected sidelink resource; and
transmit the created MAC PDU based on the selected sidelink resource.

* * * * *